United States Patent
Lee et al.

(10) Patent No.: US 12,096,833 B2
(45) Date of Patent: Sep. 24, 2024

(54) REUSABLE CARTRIDGE SYSTEMS, DEVICES, AND METHODS

(71) Applicant: L'OREAL, Paris (FR)

(72) Inventors: Ji Lee, New York, NY (US); Nicholas Sinclair, San Diego, CA (US); Damien Levi, Berkeley Heights, NJ (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 18/361,749

(22) Filed: Jul. 28, 2023

(65) Prior Publication Data

US 2024/0023691 A1     Jan. 25, 2024

Related U.S. Application Data

(63) Continuation of application No. 17/187,577, filed on Feb. 26, 2021, now Pat. No. 11,712,099.

(51) Int. Cl.
    A45D 24/26    (2006.01)
    A45D 34/00    (2006.01)

(52) U.S. Cl.
    CPC ........ *A45D 24/26* (2013.01); *A45D 2034/005* (2013.01); *A45D 2200/25* (2013.01)

(58) Field of Classification Search
    CPC .............. A45D 24/26; A45D 2034/005; A45D 2200/25; A45D 34/042; A45D 40/262;
    (Continued)

(56) References Cited

U.S. PATENT DOCUMENTS 1,190,017 A    7/1916 Scheel
1,818,281 A    8/1931 Soss
(Continued)

FOREIGN PATENT DOCUMENTS

CN    201452024    5/2010
EP    1459782      9/2004
(Continued)

OTHER PUBLICATIONS

Written Opinion and Preliminary Search Report mailed on Feb. 21, 2022, issued in French Application No. 2106032, filed on Jun. 8, 2021, 7 pages.
(Continued)

*Primary Examiner* — David J Walczak
(74) *Attorney, Agent, or Firm* — Christensen O'Connor Johnson Kindness PLLC

(57) ABSTRACT

Formulation delivery systems include a reusable handle, a formulation dispensing assembly, and a controller. The formulation dispensing assembly includes a reciprocating nozzle assembly and a pump. The reciprocating nozzle assembly is fluidically-coupleable to the formulation cartridge or the cleaning cartridge received within the reusable handle. Formulation delivery devices include a reusable handle configured to receive a formulation cartridge therein, and a formulation dispensing assembly disposed in the reusable handle. The formulation dispensing assembly includes fluid conduits, a pump fluidically connected to the fluid conduits, a reciprocating nozzle assembly, and a controller. Formulation cartridges include a reusable cartridge body, a valve frame, and a disposable refill packet reversibly-coupleable to the reusable cartridge body. The disposable refill packet includes a formulation packet and a body portion configured for insertion into the reusable cartridge body.

20 Claims, 12 Drawing Sheets

(58) Field of Classification Search
CPC .. A45D 2034/002; A45D 34/04; A45D 34/00; A45D 37/00; A45D 2200/20; A61M 35/00; A61M 35/003
USPC .................................................. 401/44–47
See application file for complete search history.

(56) References Cited

U.S. PATENT DOCUMENTS

| | | | |
|---|---|---|---|
| 2,074,481 | A | 3/1937 | Macmullen |
| 2,272,641 | A | 2/1942 | Mureau |
| 2,799,881 | A | 7/1957 | Howe |
| 3,608,782 | A | 9/1971 | Sathicq |
| 4,406,406 | A | 9/1983 | Knapp |
| 4,533,273 | A | 8/1985 | Obata |
| 4,617,875 | A | 10/1986 | Holland |
| 4,704,226 | A | 11/1987 | Naylor |
| 4,760,937 | A | 8/1988 | Evezich |
| 4,974,984 | A | 12/1990 | Kafkis |
| 4,993,859 | A | 2/1991 | Assad |
| 5,289,691 | A | 3/1994 | Schlosser |
| 5,432,582 | A | 7/1995 | Horning |
| 5,454,486 | A | 10/1995 | Mack |
| 5,482,058 | A | 1/1996 | Garconnet |
| 5,839,451 | A | 11/1998 | Dorber |
| 5,937,865 | A | 8/1999 | Dhaliwal |
| 6,022,163 | A | 2/2000 | Asfur |
| 6,877,924 | B1 | 4/2005 | Mears |
| 7,157,816 | B2 | 1/2007 | Pilcher |
| 7,481,592 | B2 | 1/2009 | Gueret |
| 7,648,364 | B2 | 1/2010 | Dauga et al. |
| 7,722,277 | B2 | 5/2010 | Byun |
| 7,786,626 | B2 | 8/2010 | Reishus |
| 7,794,168 | B2 | 9/2010 | Chang |
| 8,007,192 | B2 | 8/2011 | Huang |
| 8,220,469 | B1 | 7/2012 | Spagnuolo |
| 8,343,116 | B2 * | 1/2013 | Ignon ............... A61P 17/02 604/289 |
| 8,464,732 | B2 | 6/2013 | Wong |
| 8,506,193 | B1 | 8/2013 | Zhang |
| 8,550,739 | B1 | 10/2013 | Robbins |
| 9,032,576 | B2 * | 5/2015 | Zelickson ........... A46B 13/04 15/22.1 |
| 9,211,756 | B2 | 12/2015 | Ballot |
| 9,364,068 | B2 | 6/2016 | Kodama |
| 9,462,873 | B2 | 10/2016 | Casasanta, III |
| 11,399,617 | B2 | 8/2022 | Dinh |
| 11,534,263 | B2 | 12/2022 | Lee et al. |
| 2003/0059247 | A1 | 3/2003 | Kandasamy |
| 2005/0184091 | A1 | 8/2005 | Abergel |
| 2006/0175352 | A1 | 8/2006 | Emmendorfer |
| 2006/0210352 | A1 | 9/2006 | Clark |
| 2008/0083845 | A1 | 4/2008 | Lind |
| 2008/0106156 | A1 | 5/2008 | Reishus |
| 2008/0167590 | A1 | 7/2008 | Jon |
| 2008/0317544 | A1 | 12/2008 | Spirk |
| 2008/0319446 | A1 | 12/2008 | Young |
| 2009/0016805 | A1 | 1/2009 | Byun |
| 2009/0020551 | A1 | 1/2009 | Malvar |
| 2009/0097899 | A1 | 4/2009 | Carroll |
| 2009/0154985 | A1 | 6/2009 | Wyatt |
| 2009/0180825 | A1 | 7/2009 | Chang |
| 2010/0132730 | A1 | 6/2010 | Jung |
| 2011/0116857 | A1 | 5/2011 | Carroll |
| 2011/0240766 | A1 | 10/2011 | Peterson |
| 2011/0308034 | A1 | 12/2011 | Powers |
| 2012/0260931 | A1 | 10/2012 | Martin |
| 2012/0328353 | A1 | 12/2012 | Svendsen |
| 2013/0118515 | A1 | 5/2013 | Wurtz |
| 2013/0123825 | A1 | 5/2013 | Demjanenko |
| 2013/0158547 | A1 | 6/2013 | David |
| 2013/0223915 | A1 | 8/2013 | Simonian |
| 2014/0000047 | A1 | 1/2014 | Boyd |
| 2014/0014543 | A1 | 1/2014 | Hohlbein |
| 2014/0064821 | A1 | 3/2014 | Price |
| 2014/0219705 | A1 | 8/2014 | Posnick |
| 2014/0360527 | A1 | 12/2014 | Thompson |
| 2015/0308421 | A1 | 10/2015 | Vogt |
| 2016/0015150 | A1 | 1/2016 | Casasanta, III |
| 2016/0143408 | A1 | 5/2016 | Grez |
| 2016/0166032 | A1 | 6/2016 | Grez |
| 2016/0183664 | A1 | 6/2016 | Grez |
| 2016/0331308 | A1 | 11/2016 | Zhou |
| 2018/0116363 | A1 | 5/2018 | Grez |
| 2019/0098974 | A1 | 4/2019 | Grez et al. |
| 2019/0143481 | A1 | 5/2019 | Wang |
| 2020/0113360 | A1 | 4/2020 | Kim |
| 2022/0273084 | A1 | 9/2022 | Lee et al. |
| 2023/0117798 | A1 | 4/2023 | Lee et al. |

FOREIGN PATENT DOCUMENTS

| | | |
|---|---|---|
| EP | 1669139 | 6/2006 |
| EP | 2211235 | 7/2010 |
| FR | 2992856 | 1/2014 |
| JP | 61139795 | 6/1986 |
| JP | 6346976 | 3/1988 |
| JP | 2002326677 | 11/2002 |
| JP | 2003319835 | 11/2003 |
| JP | 2004051122 | 2/2004 |
| JP | 2004155484 | 6/2004 |
| JP | 2005206230 | 8/2005 |
| JP | 2006069581 | 3/2006 |
| JP | 2007308181 | 11/2007 |
| JP | 2008531083 | 8/2008 |
| JP | 2011502656 | 1/2011 |
| JP | 2013082478 | 5/2013 |
| JP | 2013106741 | 6/2013 |
| JP | 2020534953 A | 12/2020 |
| KR | 101311142 | 9/2013 |
| KR | 102139207 B1 | 7/2020 |
| WO | 9310020 | 5/1993 |
| WO | 2006090998 | 8/2006 |
| WO | 2008023955 | 2/2008 |
| WO | 2009064762 | 5/2009 |
| WO | 2011009282 | 1/2011 |
| WO | 2012150779 | 11/2012 |
| WO | 2013096520 | 6/2013 |
| WO | 2014009282 | 1/2014 |
| WO | 2019067336 | 4/2019 |
| WO | 2019067336 A2 | 4/2019 |

OTHER PUBLICATIONS

International Search Report and Written Opinion mailed on May 6, 2022, issued in corresponding International Patent Application No. PCT/US2022/017350, filed on Feb. 22, 2022, 14 pages.

International Search Report and Written Opinion mailed on May 10, 2022, issued in International Patent Application No. PCT/US2022/017353, filed on Feb. 22, 2022, 12 pages.

Office Action for U.S. Appl. No. 17/187,583, filed Feb. 26, 2021, mailed on Feb. 22, 2024. 8 pages.

Office Action dated Jun. 26, 2024 for JP Pat App No. 2023-552026, received on Jul. 8, 2024. 5 pages.

* cited by examiner

REUSABLE CARTRIDGE SYSTEMS, DEVICES, AND METHODS

CROSS-REFERENCE TO RELATED APPLICATION

This application is a continuation of U.S. application Ser. No. 17/187,577, filed on Feb. 26, 2021, herein incorporated in its entirety expressly by reference.

SUMMARY

In an aspect, the present disclosure is directed to, among other things, systems, devices, and cartridges for delivering a formulation, and methods for using the same. In an embodiment, described are one or more methodologies or technologies that are configured to deliver a cosmetic formulation having a dye component and a developer component to a user's skin, hair, and the like. Advantageously, the disclosed embodiments provide better user experience, better performance and reliability, and more sustainable construction.

The foregoing aspects and many of the attendant advantages of the claimed subject matter will become more readily appreciated by reference to the following detailed description, when taken in conjunction with the accompanying drawings.

DETAILED DESCRIPTION

Described are one or more methodologies or technologies for allowing users to apply treatment formulations to human hair and scalp tissue. The following description provides representative examples that relate generally to hair and scalp treatment delivery systems, devices, and formulation cartridges for the same. In an embodiment, it is beneficial for the treatment formulation to be applied to a targeted portion of the hair or scalp tissue. In an embodiment, applying a treatment formulation to a portion of the hair near the scalp is desired, for instance, when applying a coloring dye to roots of hair during a color maintenance procedure. In another example, an approach requires applying a scalp treatment formulation directly to the scalp tissue, while minimizing contact with the hair.

Existing systems for the application of hair and scalp treatment formulations have been widely used. In one example, hair-coloring kits are generally used to change the appearance of the hair color or to blend gray hairs, among other uses. Existing hair coloring systems have several disadvantages, including difficulty of use, time consumption, uneven coverage, unpredictable results, excessive mess, etc. In one aspect, existing hair coloring systems can be ineffective in blending and coloring the roots of the hair after new segments of hair have grown from the scalp, where the natural hair color differs from the remainder of the dyed hair. The present disclosure is directed toward solving these and other needs.

In some embodiments, hair coloring formulation includes at least one dye and a separate developer, which are mixed in controlled proportions. However, "formulation" is not limited to dye and developer in this disclosure. As used herein, the term "formulation" refers generally to any of the dye, developer, formulation, fluid, or any mixture thereof. In this disclosure, "formulation" includes: permanent hair dye; semi-permanent hair dye; developer; conditioner; hair growth treatment, such as minoxidil manufactured under the trade name ROGAINE®; hair protein treatment; disulfide bond repairing hair treatment; fluid hair treatment; fluid scalp treatment, and the like.

Embodiments of the present disclosure are configured to apply formulation to targeted areas of the hair and scalp tissue. Although any of the above-mentioned formulations are suitably applied using the embodiments described herein, the present disclosure generally refers to hair coloring formulation as one o example of treatment formulation applied by the systems and devices described below. However, it shall be appreciated that any of the systems, devices, cartridges, and methods may be utilized with any of the above-mentioned formulations.

Figure 1:
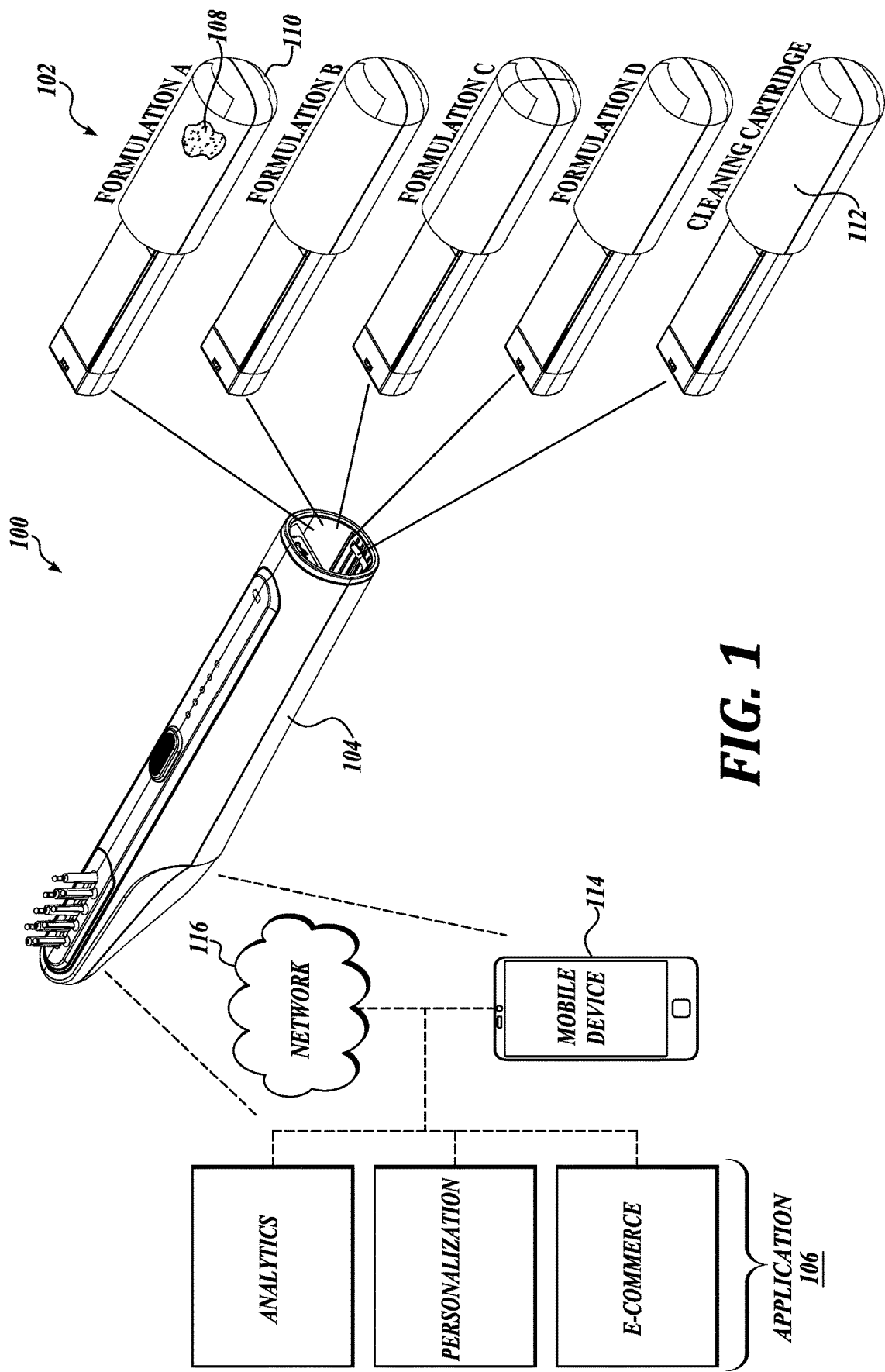
FIG. 1 shows a schematic view of a formulation delivery system, in accordance with a representative embodiment of the present disclosure.

FIG. 1 illustrates one representative formulation delivery system 100 in accordance with the present disclosure. The formulation delivery system 100 includes a number of different features, including a formulation product line 102, a formulation delivery device 104, and an optional application 106, which together enable a customized user experience.

Formulation product line 102 includes different formulations 108, each being stored in a same (common) formulation cartridge 110 type that is configured for use with the formulation delivery device 104. Cartridges of the common formulation cartridge type are generally configured for insertion into a cartridge cavity of a reusable handle of the formulation delivery device. For example, in some embodiments, formulation cartridges and cleaning cartridges have a common cross-sectional shape and dimensions. Additionally, some embodiments of the common formulation cartridge type have a common number and arrangement of output nozzles.

Thus, the common formulation cartridge 110 type enables a consumer to utilize many different formulations in a single formulation delivery device 104. A representative formulation cartridge 110 type is described below in FIG. 8A-FIG. 10, and a representative cleaning cartridge 112 is described in FIG. 12.

In a representative embodiment, the formulation product line 102 includes a hair coloring formulation and a scalp treatment formulation. In other representative embodiments, the formulation product line 102 comprises at least two, three, four, five, six, seven, or eight of the following different formulations, each of which is stored within the same formulation cartridge 110 type: a permanent hair dye and a developer; a semi-permanent hair dye and a developer; a shampoo; a conditioner; a hair growth treatment such as minoxidil; a hair protein treatment; a disulfide bond repairing hair treatment; or a fluid scalp treatment. In still further representative embodiments, the formulation product line 102 includes any of the above combinations, in addition to an optional cleaning cartridge 112 of the same formulation cartridge 110 type.

Formulation cartridge 110 type has an elongate shape and dimensions configured for insertion into a handle of the formulation delivery device 104, in particular into a cartridge cavity of the handle. In some embodiments of the formulation delivery system 100, the elongate outer housing has a different construction between formulation cartridges 110 containing formulation and the cleaning cartridge 112, but with common a common shape and dimensions. For example, in some embodiments, formulation cartridges 110 containing formulation have the construction of the partially recyclable embodiment shown in FIG. 8A-FIG. 10, while the cleaning cartridge 112 has similar shape and dimensions, but different materials and components.

Another feature of the formulation cartridge 110 type is a plurality of liquid output nozzles, which are sized and positioned at a distal (forward) end of the formulation cartridge 110 in a configuration that fluidically connects with a corresponding plurality of liquid inlets (e.g., first formulation inlets). In some embodiments, the liquid output nozzles are valves of formulation packets disposed in the formulation cartridge 110.

A representative formulation cartridge 110 type, which is configured for insertion into formulation delivery device 104 and for storing a first formulation and a second formulation, is described below in FIG. 8A-FIG. 10.

Cleaning cartridge 112, which is of the common formulation cartridge 110 type (i.e., has common exterior dimension and a plurality of liquid output nozzles), enables a user to clean the formulation delivery device 104 by executing a cleaning routine that flushes a cleaning liquid (e.g., water) from the cleaning cartridge 112 through the fluid conduits of the formulation delivery device 104, thereby removing residual formulation in the formulation delivery device 104. Advantageously, the cleaning cartridge 112 and cleaning routine enable a significant portion of the formulation delivery device 104 to be reused for different formulations, thereby reducing waste and cost.

Cleaning cartridge 112 includes a refillable cleaning liquid reservoir disposed inside the outer housing, which is fluidically connected to the plurality of output nozzles. Thus, a user can fill the cleaning liquid reservoir with a cleaning liquid such as water, execute a number of cleaning routines on the formulation delivery device 104, and refill the cleaning liquid reservoir.

Formulation delivery device 104 is a connected electromechanical appliance that interacts with the user, with formulation cartridges 110, and optionally with the application 106 in order to provide a customized and personalized user experience. A representative formulation delivery device and sub-systems thereof are described below with respect to FIG. 4-FIG. 7.

Generally, formulation delivery device 104 comprises a reusable handle configured to receive the formulation cartridge 110 type, as well as a formulation dispensing assembly and a controller, both being disposed in the reusable handle. The formulation dispensing assembly comprises at least one fluid conduit fluidically connected to a motorized pump and to a reciprocating nozzle assembly, and is configured to draw formulation or cleaning liquid from the formulation cartridge 110 and to dispense the same through the reciprocating nozzle assembly onto a hair portion, scalp portion, or body portion of a user.

The controller is configured to toggle between at least a cleaning routine and formulation routine responsive to one or more inputs indicative of the cleaning cartridge or the formulation cartridge inserted into the reusable handle. The controller communicates with an encryption chip reader of a cartridge authentication interface in the reusable handle to read an encryption chip disposed on the formulation cartridge 110, in order to authenticate which formulation 108 is stored in the formulation cartridge 110 which is inserted into the reusable handle at any given time. In some embodiments, the controller also authenticates when the cleaning cartridge 112 is inserted into the reusable handle. Based upon the authenticated formulation 108 or cleaning cartridge 112, the controller causes the formulation delivery device 104 to execute a formulation routine that dispenses the authenticated formulation from the formulation cartridge through the formulation dispensing assembly. Based upon the authenticated cleaning cartridge 112, the controller also causes the formulation delivery device 104 to execute a cleaning routine that dispenses the cleaning liquid through the formulation dispensing assembly.

Application 106 includes logic configured for operation on a non-transitory machine-readable storage medium, and includes modules that personalize the user experience, provide helpful analytics, and enable e-commerce. Application 106 runs on a mobile device 114 such as a smartphone, a tablet, or the like, and interacts with a user (e.g., an end user or a salon technician) to provide actionable information through a plurality of modules, which are described below with respect to FIG. 3. In some embodiments, the application 106 communicates with the formulation delivery device 104 and a network 116, such as a mobile network, a cloud-based enterprise network, a local area network, or the like.

Together, the formulation product line 102, formulation delivery device 104, and application 106 provide an improved, customized, user experience. Each of the foregoing elements of the formulation delivery system 100 will now be described in detail.

Figure 2:
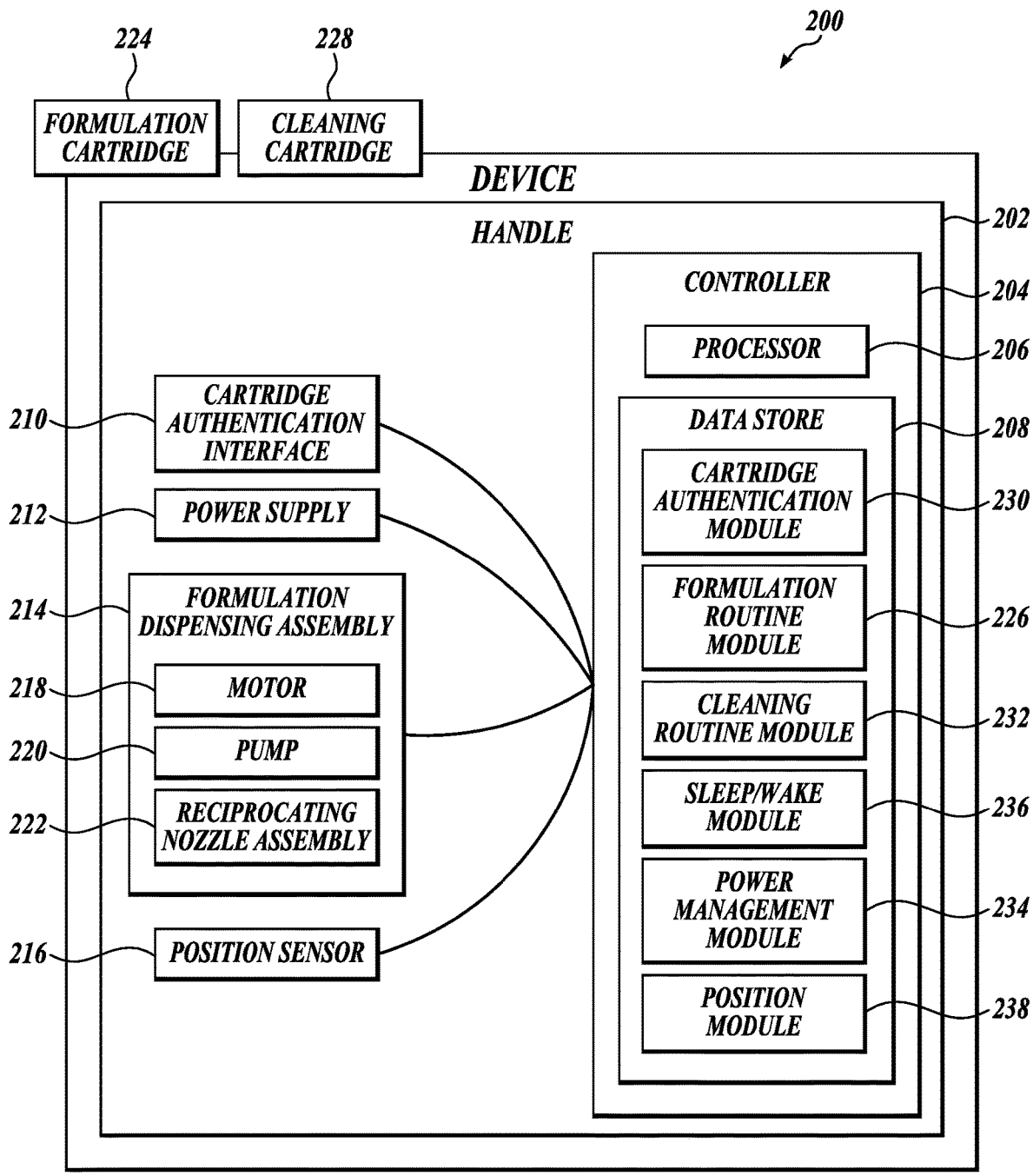
FIG. 2 shows a schematic overview of a formulation delivery device, in accordance with a representative embodiment of the present disclosure.

FIG. 2 shows a schematic overview of a representative formulation delivery device 200, to facilitate understanding of certain representative features thereof. The formulation delivery device 200 shall be understood to have the same features as the formulation delivery device 104 of FIG. 1

Formulation delivery device 200 includes a reusable handle 202 having a hollow elongate portion configured to reversibly receive the common formulation cartridge type (including the cleaning cartridge 112). Reusable handle 202 also houses a number of sub-assemblies, including a controller 204, which includes a processor 206 and data store 208 storing a number of modules (described below), cartridge authentication interface 210, power supply 212, formulation dispensing assembly 214, and an optional position sensor 216.

Power supply 212 is, in some embodiments, a direct current (DC) power supply, such as a rechargeable battery (e.g., a lithium ion battery) configured to be charged by plugging into a household alternating current outlet. In other embodiments, power supply 212 is an alternating current (AC) power supply, such as common household alternating current that utilizes an electrical cord (not shown) to supply power to the formulation delivery device 200.

Formulation dispensing assembly 214 provides formulation and/or cleaning liquid from the formulation cartridge 110 to a user's scalp or hair. In an embodiment, formulation dispensing assembly 214 includes: a first fluid conduit fluidically connected to a first formulation inlet (which couples with a first liquid output nozzle of the formulation cartridge 110), a second fluid conduit fluidically connected to a second formulation inlet (which couples with a second liquid output nozzle of the formulation cartridge 110), a motor 218, a pump 220 driven by the motor 218, and a reciprocating nozzle assembly 222 which is also driven by the motor 218.

Cartridge authentication interface 210 is an RFID reader, a nearfield reader, or the like, which is positioned in the reusable handle 202 such that when the formulation cartridge 110 is inserted therein, the cartridge authentication interface 210 reads an encryption chip disposed on the formulation cartridge 224, in order to authenticate the formulation cartridge in connection with the formulation routine module 226 described below.

Optional position sensor 216 includes one or more sensors that, alone or collectively, aid in the determination of the position and orientation of formulation delivery device 200 relative to a user's scalp or hair. In some embodiments, position sensor 216 includes one or accelerometers, touch sensors (e.g., capacitive touch sensors), proximity sensors (e.g., optical proximity sensors), or the like. Signals transmitted from the position sensor 216 are used by the controller 204, and certain modules thereof, in order to improve the accuracy and efficiency of formulation application to a user's hair or scalp.

Controller 204 is operatively connected (e.g., electrically connected) to the power supply 212, cartridge authentication interface 210, formulation dispensing assembly 214, and optional position sensor 216. Controller 204 includes the processor 206 (e.g., a general processing unit, graphical processing unit, or application specific integrated circuit), data store 208 (a tangible machine-readable storage medium), a plurality of modules implemented as software logic (e.g., executable software code), firmware logic, hardware logic, or various combinations thereof. In some embodiments, controller 204 includes a transceiver that transmits signals from any of the modules discussed below to the mobile device, and receives signals transmitted from the mobile device.

In some embodiments, controller 204 includes a communications interface having circuits configured to enable communication with the formulation delivery system, including formulation cartridge 224 (an encryption chip), cleaning cartridge 228, cartridge authentication interface 210, a mobile device and an application stored thereon, and/or other network element via the internet, cellular network, RF network, Personal Area Network (PAN), Local Area Network, Wide Area Network, or other network. Accordingly, the communications interface may be configured to communicate using wireless protocols (e.g., WIFI®, WIMAX®, BLUETOOTH®, ZIGBEE®, Cellular, Infrared, Nearfield, etc.) and/or wired protocols (Universal Serial Bus or other serial communications such as RS-216, RJ-45, etc., parallel communications bus, etc.). In some embodiments, the communications interface includes circuitry configured to initiate a discovery protocol that allows controller 204 and other network element (e.g., the formulation cartridge 110) to identify each other and exchange control information (e.g., identity of the formulation stored in the formulation cartridge 110). In an embodiment, the communications interface has circuitry configured to a discovery protocol and to negotiate one or more pre-shared keys.

Data store 208 is a tangible machine-readable storage medium that includes a mechanism that stores information in a non-transitory form accessible by a machine (e.g., processor 206, or mobile device 114). For example, a machine-readable storage medium includes recordable/non-recordable media (e.g., read only memory (ROM), random access memory (RAM), magnetic disk storage media, optical storage media, flash memory devices, etc.).

The modules described below are representative, not limiting. Accordingly, some embodiments of the controller 204 include additional modules, while other embodiments include fewer than all modules.

Cartridge authentication module 230 communicates with the cartridge authentication interface 210 in order to authenticate any formulation cartridge 224 or cleaning cartridge 228 which is inserted into the reusable handle 202. For example, upon insertion of the formulation cartridge 224 into the reusable handle 202, the cartridge authentication interface 210 reads an encrypted information from an encryption chip disposed on the formulation cartridge 224. If the cartridge authentication interface 210 successfully reads the encrypted information from the encryption chip, then the cartridge authentication module 230 "unlocks" the formulation delivery device 200, e.g., the formulation routine module 226. If, however, the cartridge authentication interface 210 cannot successfully authenticate the formulation cartridge inserted into the reusable handle 202, then it does not unlock the formulation delivery device 200. For example, if the formulation cartridge is a counterfeit cartridge or another cartridge containing inferior formulation, then the cartridge authentication module 230 does not unlock the functionality of the formulation delivery device 200. In this way, the cartridge authentication module 230 advantageously prevents the user from being harmed or having a poor experience.

Cartridge authentication module 230 is configured, in some embodiments, to read additional information from the encryption chip, including one or more of: a formulation identification, a beginning formulation quantity, a formulation expiration date, or a formulation production date. In such embodiments, cartridge authentication module 230 transmits the additional information to other modules for subsequent use.

Formulation routine module 226 stores a plurality of formulation routines for different formulations (e.g., haircare formulation routines), and causes the formulation dispensing assembly 214 to execute one or more formulation routines, based upon the formulation cartridge 224 authenticated by the cartridge authentication module 230. A formulation routine dispenses the authenticated formulation 108 from the formulation cartridge 224 through the reciprocating nozzle assembly 222. For example, a haircare formulation routine dispenses one or more haircare formulations from the reciprocating nozzle assembly 222, for a particular dispensation time, at a particular liquid flow rate of the pump, nozzle reciprocating frequency and/or reciprocating amplitude of the reciprocating nozzle assembly 222, and/or other device operating parameter specified by the formulation routine stored in the formulation routine module 226. In this way, the formulation delivery device 200 adjusts one or more device operating parameter based upon the specific formulation stored in the authenticated formulation cartridge 224 inserted into the formulation delivery device, for more effective hair and scalp treatment.

In some embodiments, formulation routine module 226 determines, based upon a dispensed time of the authenticated formulation, a dispensed volume of the authenticated formulation from the formulation cartridge through the formulation dispensing assembly. Based upon the dispensed time and/or dispensed volume, the formulation routine module 226 causes a visual indicator on the reusable handle 202 to signal a remaining formulation quantity. This helps the user anticipate when the formulation cartridge will need to be replaced and prompts the user to utilize the e-commerce module of the connected application to conveniently procure additional formulation cartridges.

Cleaning routine module 232 stores a cleaning routine, and causes the formulation dispensing assembly 214 to execute the cleaning routine after the cleaning cartridge 228 (which has a reservoir filled with a cleaning liquid) is inserted into the reusable handle 202 and authenticated by the cartridge authentication module 230. The cleaning routine dispenses the cleaning liquid from the authenticated cleaning cartridge 228 through the reciprocating nozzle assembly 222 (e.g., for a predetermined time and at a predetermined flow rate), in order to evacuate any residual formulation within the formulation dispensing assembly 214. The cleaning routine is useful, for example, after one formulation has been utilized in the formulation delivery device 200, but before a second, different formulation is utilized. In some embodiments, the cleaning routine operates the pump 220 at a higher flow rate than one or more (or all) formulation routines stored by the formulation routine module 226, in order to clear all residual formulation.

In some embodiments, controller 204 is configured to toggle between at least a cleaning routine (provided by the cleaning routine module 232) and a formulation routine (provided by the formulation routine module 226) responsive to one or more inputs indicative of the cleaning cartridge or the formulation cartridge inserted into the reusable handle. Representative inputs include an authentication of the formulation cartridge or cleaning cartridge provided by the cartridge authentication module 230.

According to a method of the present disclosure, a method of cleaning any of the formulation delivery devices includes inserting the cleaning cartridge at least partially filled with the cleaning liquid into the reusable handle of the formulation delivery device, and executing the cleaning routine until the cleaning liquid dispensed through the formulation dispensing assembly runs clear.

Power management module 234 provides power from the power supply 212 to one or more of the controller 204, cartridge authentication interface 210, formulation dispensing assembly 214, or the position sensor 216. Additionally, power management module 234 conserves available power resources (e.g., conserves battery life) by toggling the formulation delivery device 104 in between a sleep state (a passive state) and an awake state (an active state).

Sleep/awake module 236 manages whether the formulation delivery device 200 is in an awake state or a sleep state. The formulation delivery device 200 is in a sleep state by default, whereby little to no power is provided from the power supply 212 to the formulation dispensing assembly 214, cartridge authentication interface 210, and/or controller 204. In the sleep state, the formulation delivery device 200 is incapable of executing a formulation routine or cleaning routine. In the awake state, by comparison, the controller 204, cartridge authentication interface 210, formulation dispensing assembly 214, and position sensor 216 are sufficiently powered such that the formulation delivery device 104 is able to execute one or more formulation routines or cleaning routines. In some embodiments, the formulation delivery device 104 is "awakened," i.e., brought from the sleep state to the awake state, by: a push of a button disposed on the reusable handle 202, or by insertion of a formulation cartridge 224 or cleaning cartridge 228 into the reusable handle 202. In some embodiments, the formulation delivery device 200 returns to the sleep state after a predetermined inactivity period (e.g., 120 seconds of inactivity).

Position module 238 utilizes a position signal provided by the position sensor 216 to determine the position of the formulation delivery device 200, which position information is then provided to the formulation routine module 226 in order to facilitate execution of a formulation routine, e.g., a calibration routine. In some embodiments, the position module 238 provides the position signal to an application stored on a mobile device (via the transceiver), e.g., to enable execution of a calibration routine (described below) and/or to enable the application to display a correct application indication based upon the position signal.

Figure 3:
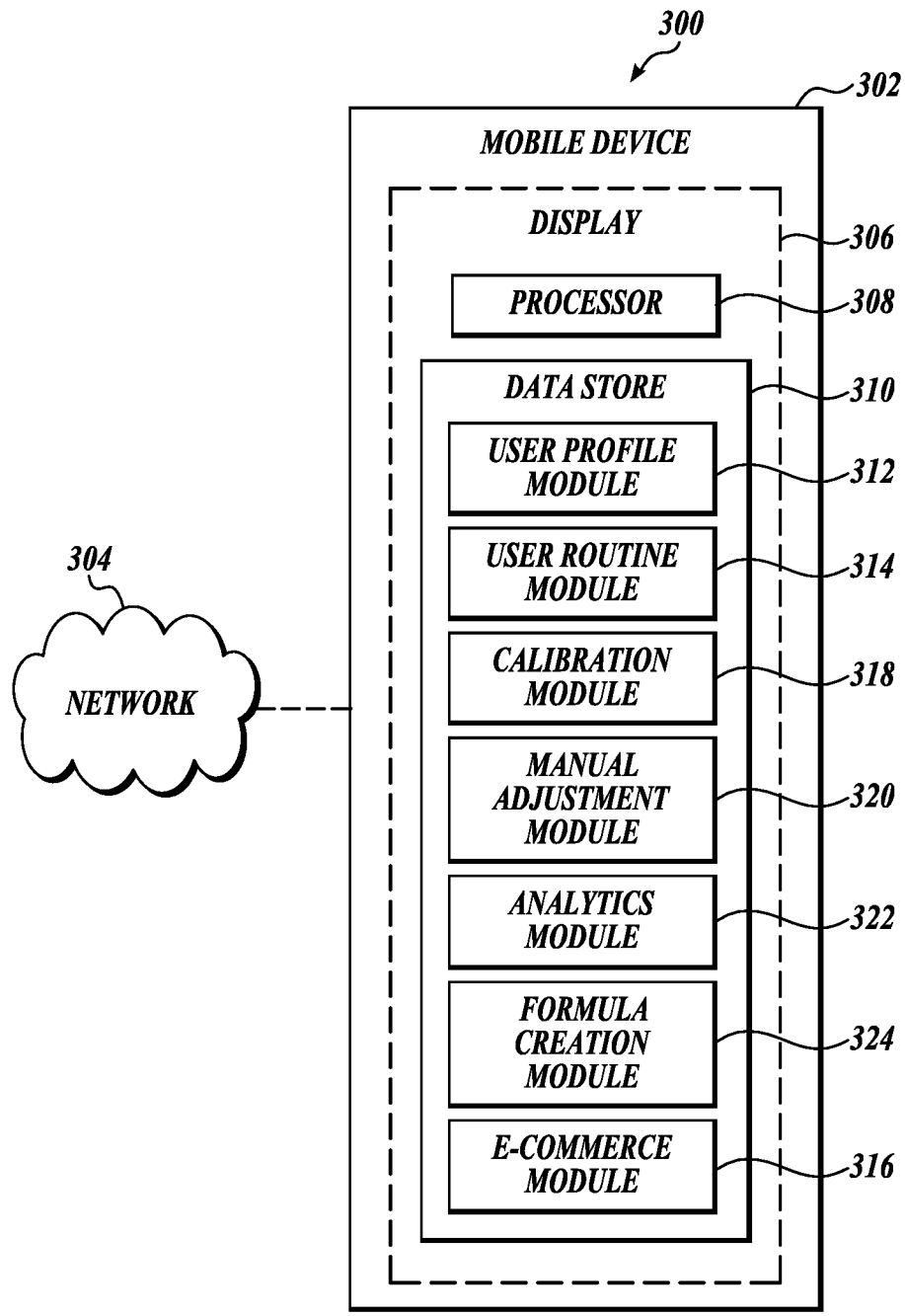
FIG. 3 shows a schematic overview of an application of a formulation delivery system, in accordance with a representative embodiment of the present disclosure.

FIG. 3 shows a schematic overview of a representative application 300, which shall be understood to have all feature of application 106 of FIG. 1 and is compatible with all formulation delivery systems and formulation delivery devices of the present disclosure. As noted above, the application 300 is configured to operate on a device, for example a mobile device such as a smartphone or a tablet. As one representative example, the application 300 is described in the context of a mobile device 302 connected to a network 304; however, this is not limiting.

Mobile device 302 has a display 306 (e.g., an LED or LCD display), a processor 308, and a data store 310 storing a plurality of modules. The terms "processor," "data store," and "module" have the same meaning as described above with respect to the controller 204, and as used below in connection with representative formulation delivery devices.

Each module described below presents one or more user interfaces on the display 306. The display 306 is a touch-sensitive display that is configured to receive user inputs thereon. Accordingly, for each module, the user interface presented on the display 306 is configured both to display information and to receive user inputs.

Application 300 includes a number of modules which personalize the user experience, including a user profile module 312 and user routine module 314. The modules described below are representative, not limiting. Accordingly, some embodiments of the application 300 include additional modules, while other embodiments include fewer than all modules.

User profile module 312 builds one or more profiles for users of the formulation delivery device 104. These profiles are provided as inputs to other modules, for example the user routine module 314 and the e-commerce module 316. Accordingly, the user profile module 312 provides one or more user interfaces that prompt a user to provide one or more user profile inputs, including: a hair color, a hair type (e.g., curly, straight), a colored/not colored state, an ethnicity, a hair condition (e.g., damaged), a scalp condition (e.g., itchy), and/or an age. The user profile module 312 accepts and stores the user profile inputs.

In some embodiments, user profile module 312 communicates with user routine module 314 by providing one or more of the user profile inputs, or an entire user profile, to the user routine module 314. The user routine module 314 then utilizes one or more of the user profile inputs to create one or more user-specific routines for the user and/or to select one or more tutorials to present on the display 306.

In some embodiments, user profile module 312 communicates with formulation delivery device 104. For example, in some embodiments, the user profile module 312 adjusts at least one device operating parameter of a formulation routine (e.g., flow rate, dispense time, reciprocating amplitude, or reciprocating frequency) generated by the formulation routine module based upon one or more of the user profile inputs.

User routine module 314 helps the user effectively utilize the connected formulation delivery device by, in some embodiments, formulating one or more user-specific routines for each user based upon one or more user profile inputs. That is, the user routine module 314 builds a new formulation routine (rather than selecting a predetermined formulation routine) in order to effectively treat one or more condition s identified by the user profile inputs or to achieve one or more goals identified by the user profile inputs. As one representative example, where user inputs indicate that the user's hair is both colored and damaged, the user routine module 314 builds a user-specific routine that selects an appropriate hair repair formulation and shampoo formulation for the user's hair color from the formulation product line, and displays the user-specific routine (e.g., as instructions) for utilizing the selected hair repair formulation and shampoo at an interval in determined to improve the health of the user's hair.

In addition, user routine module 314 displays on the display 306: a) one or more passive tutorials for formulation routines, cleaning routines, and/or calibration routines; and/or one or more active instruction sets that instruct the user, as the user uses the formulation delivery device.

In some embodiments, the user routine module 314 receives one or more of the user profile inputs, or an entire user profile, from the user profile module 312, and then displays a passive tutorial (e.g., a pre-recorded instructional video) that is targeted at the user based upon the received user profile inputs or the user profile. As one example, the user routine module 314 receives a user profile input from the user profile module 312 indicating that the user has colored hair, and displays a tutorial on the display 306 showing the user how to use the formulation delivery device to color the user's hair.

In some embodiments, the user routine module 314 receives one or more position signals from the position sensor of the formulation delivery device via the controller. Based upon the received position signals, the user routine module 314 instructs the user how to use the formulation delivery device as the user uses the device (e.g., instructions to move the formulation delivery device in a particular direction, at a particular speed, in a particular pattern, to a particular spatial boundary). As one example, the user routine module 314 receives a position signal from the position sensor indicating that the formulation delivery device is positioned at a user's left temple; based upon this received position signal, the user routine module 314 displays a video instructing the user to apply a scalp treatment formulation by moving the formulation delivery device from the left temple to the right temple while dispensing the scalp treatment formulation.

In some embodiments, user routine module 314 receives a position signal from the formulation delivery device and displays a correct application indication based upon the position signal.

Calibration module 318 helps the user calibrate the formulation delivery device, which in turn increases the efficacy of formulation routines executed by the formulation delivery device. In some embodiments, the calibration module 318 displays a passive tutorial (e.g., a pre-recorded instructional video) that instructs the user how to complete a calibration routine. In some embodiments, the calibration module 318 provides one or more active instruction sets that instruct on how to use the complete a calibration routine as the user uses the formulation delivery device, and as the calibration module 318 receives position signals from the formulation delivery device.

According to one representative calibration routine, the calibration module 318 instructs the user to position the formulation delivery device at a plurality of calibration locations of a body portion of the user, e.g., in a particular order (e.g., a left temple, then a right temple, then a front hairline, and then a rear hairline). The user then moves the formulation delivery device to each of the calibration locations, indicating with a press of a button on the formulation delivery device or other action when the formulation delivery device is at the specified calibration location, and/or while the user moved the formulation delivery device from one calibration location to another.

Based upon position signals received from the position sensor of the formulation delivery device, the calibration module 318 and/or the formulation delivery device records the calibration locations. Then, the calibration module 318 and/or the formulation delivery device adjusts one or more user-specific routines based upon the recorded calibration locations. In some embodiments, this adjustment step includes adjusting a spatial limit and/or a temporal duration of one or more formulation routines stored in the formulation routine module).

Manual adjustment module 320 enables a user to manually adjust one or more device operating parameter of the formulation delivery device (e.g., flow rate, dispense time, reciprocating amplitude, or reciprocating frequency), for the advantage of greater control over the formulation delivery device and a more customized user experience. Accordingly, the manual adjustment module 320 presents a user interface with one or more user-adjustable and virtual sliding scales, switches, editable value fields, and the like, which are configured to receive one or more operating parameter inputs from the user. The manual adjustment module 320 receives the operating parameter inputs and transmits said operating parameter inputs to the formulation delivery device (e.g., the formulation routine module), which adjusts the corresponding device operating parameter based upon the corresponding operating parameter input (e.g., to match the operating parameter input).

Analytics module 322 receives device operating parameters (e.g., from formulation delivery device and computes helpful analytics, which the analytics module 322 then provides to the user via the user interface and/or to a third party via the network 304. Representative analytics include: a formulation usage pattern, a formulation purchase prediction, and diagnostics of the formulation delivery device. In some embodiments, analytics module 322 communicates with network 304 (e.g., an analytic platform disposed on one or more cloud-based servers) to retrieve additional information and/or to compute said analytics.

In some embodiments where the formulation delivery device comprises a position sensor that sends a position signal to the controller, and a transceiver that send the position signal to the mobile device. The formulation delivery device transmits the position signal to analytics module 322, which retrieves a user suggestion from an analytic platform on the network 116 based upon the received position signal and displays the user suggestion.

Formula creation module 324 enables a user to create a custom formulation based upon a user's selection of one or more formulation inputs, which correspond to one or more desired outcomes (e.g., desired hair color), one or more formulation inputs (e.g., an indication that the user's hair is damaged), and/or one or more of the user profile inputs provided to the user profile module 312. Accordingly, the formula creation module 324 is configured to receive one or more user profile inputs from the user profile module 312, and to formulate a custom formulation based upon those inputs.

To facilitate the user's creation of the custom formulation, formula creation module 324 provides a user interface with one or more user-adjustable and virtual sliding scales, switches, editable value fields, and the like corresponding to each formulation input. In some embodiments, formula creation module 324 communicates with network 304 (e.g., a database of formulations disposed on one or more cloud-based servers) to retrieve additional information and/or to formulate said custom formulation.

E-commerce module 316 presents a purchase interface that enables a user to purchase (including on a one-time or subscription basis) products related to the formulation delivery device. In some embodiments, e-commerce module 316 retrieves one or more custom formulations from formula creation module 324 (or components thereof) and presents on the purchase interface an option for the user to purchase one or more formulation cartridges 110 containing the custom formulation. In some embodiments, e-commerce module 316 retrieves one or more user profile inputs and/or user-specific routine inputs from user profile module 312 and presents on the purchase interface an option for the user to purchase one or more formulation cartridges containing the formulations which target the user profile inputs (for example, where the user inputs indicate damaged hair, a formulation cartridge containing a hair repair formulation). In some embodiments, e-commerce module 316 presents on the purchase interface an option to purchase the cleaning cartridge 112 or formulation delivery device 104 and/or components thereof. Such purchase interface and purchase options may be based upon a formulation usage pattern and/or a formulation purchase prediction retrieved from the analytics module 322.

Figure 4:
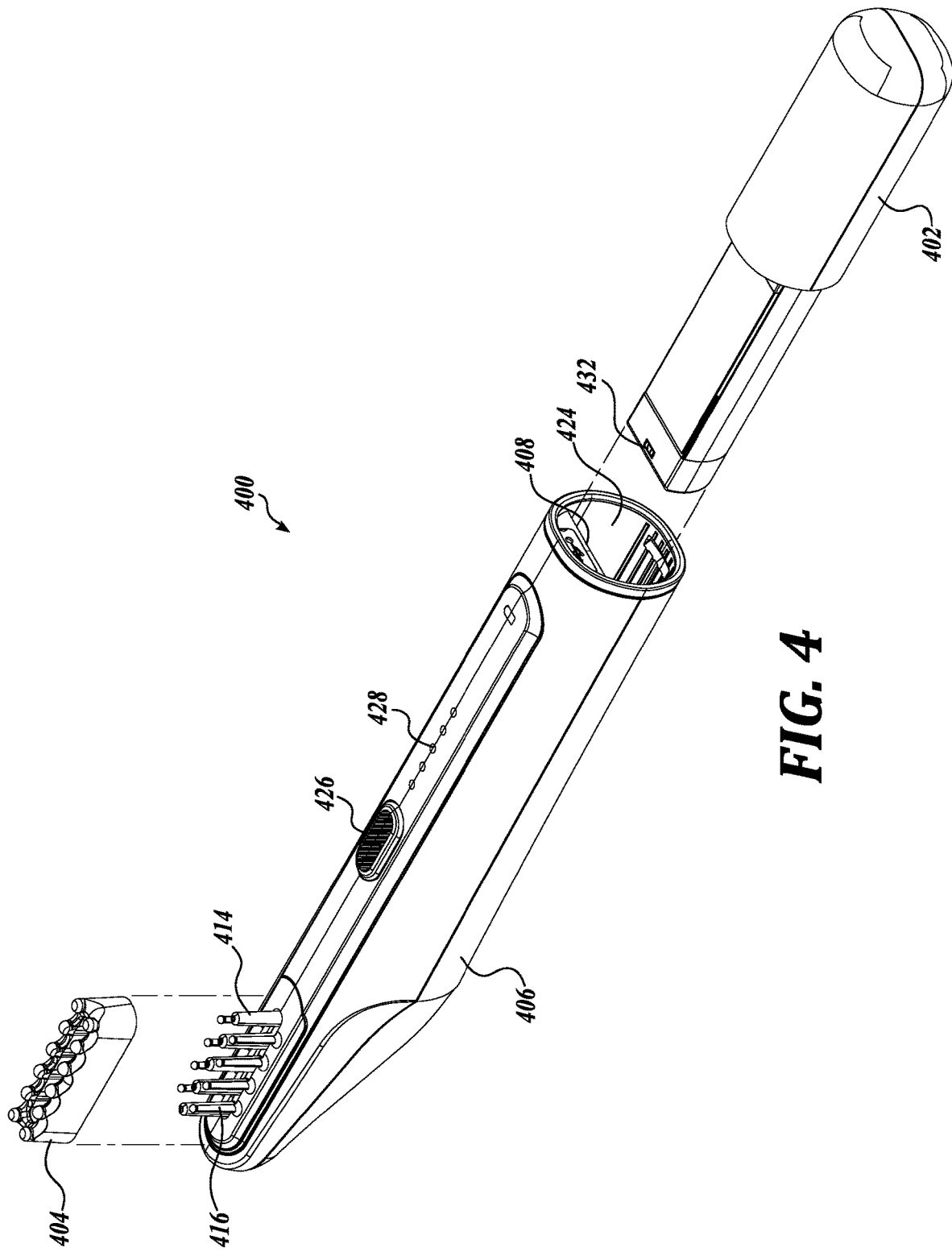
FIG. 4 shows an exploded perspective view of a formulation delivery device, in accordance with a representative embodiment of the present disclosure.
Figure 5:
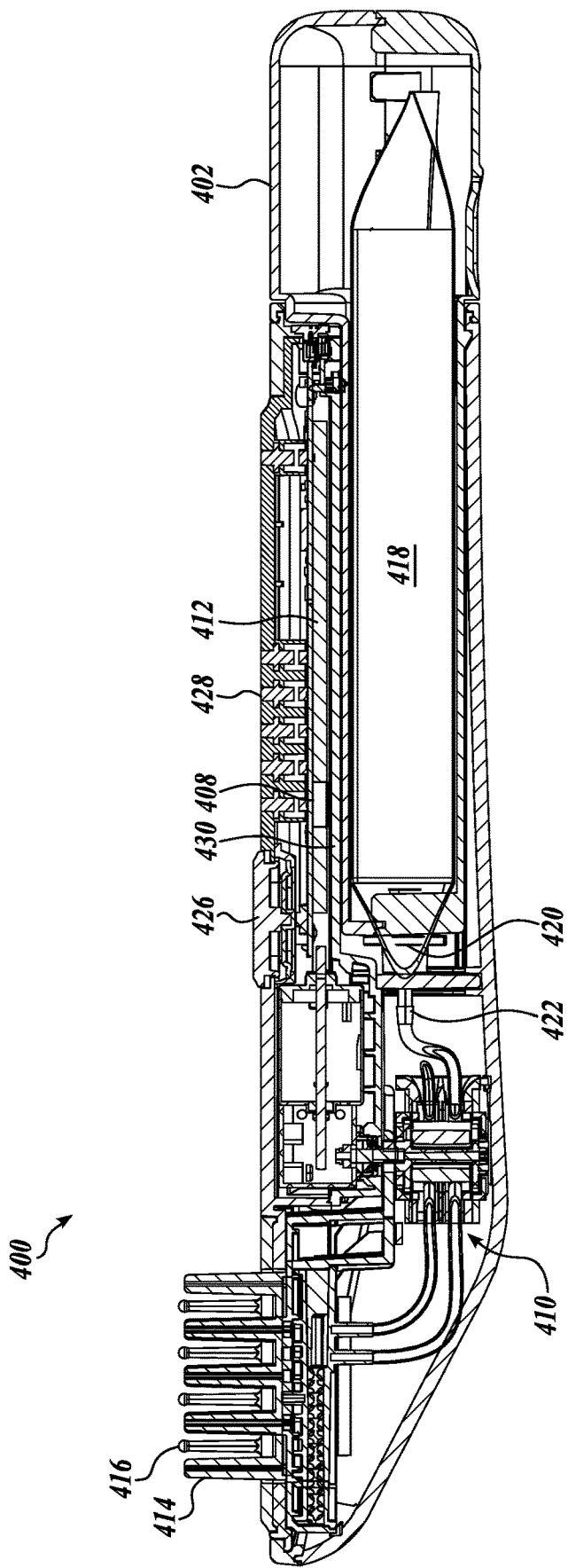
FIG. 5 shows a side section view of the formulation delivery device of FIG. 4.

FIG. 4-FIG. 5 show a representative formulation delivery device 400, and components thereof, in accordance with an embodiment of the present disclosure. The formulation delivery device 400 is configured to receive a formulation cartridge 402 type (including a cleaning cartridge of the same type). An embodiment of a formulation cartridge of the formulation cartridge 402 type is described below in detail with respect to FIG. 8A-FIG. 10; the formulation cartridge 402 shown in FIG. 4 shall be understood to have the same features as described there. Some embodiments of formulation delivery device 400 include the formulation cartridge 402 and/or an optional pull through adaptor 404.

Formulation delivery device 400 includes a reusable handle 406 formed from an ABS plastic or similar rigid polymer or other material, and in some embodiments is an assembly formed from a plurality of shells configured to be joined together with fastening elements such as snaps, screws, or the like. Reusable handle 406 has a hollow, elongate gripping portion with a cartridge cavity therein which is sized and dimensioned to receive the formulation cartridge 402 type. In some embodiments, the cavity includes keying features that facilitate correct insertion of the formulation cartridge 402 type. For example, some embodiments include a cartridge interface 408 disposed in the opening and having a flat docking surface that interfaces with a corresponding docking surface of the formulation cartridge 402 when the latter is correctly inserted into the opening.

Reusable handle 406 houses a formulation dispensing assembly 410 (described below with respect to FIG. 5-FIG. 7), in addition to a controller 412. The formulation dispensing assembly 410 and controller 412 have the same features as the formulation dispensing assembly 214 and controller 204 of FIG. 2, respectively. An embodiment of a formulation dispensing assembly is described below in detail with respect to FIG. 6-FIG. 7; the formulation dispensing assembly 410 shown in FIG. 4 shall be understood to have the same features as described there.

Formulation dispensing assembly 410 dispenses formulation or cleaning liquid from the formulation cartridge 402, and includes a pump, fluid conduits, a mixing chamber, and a reciprocating nozzle assembly 414 (described below) with nozzles that extend away from the forward end of the reusable handle 406 in between a plurality of optional standoff portions 416. Reciprocating nozzle assembly 414 includes a plurality of annular nozzles that reciprocate back-and-forth along a track of the reusable handle 406 while dispensing formulation onto a user's skin or hair. In some embodiments, the reciprocating nozzle assembly 414 reciprocates at a reciprocating amplitude 7.0-12.0 mm (e.g., 8.0 mm-11.0 mm, or 9.0-10.0 mm) and/or at a reciprocating frequency of 5.0 Hz-10.0 Hz (e.g., 6.0 Hz-9.0 Hz, 6.0 Hz-8.0 Hz), which are adjustable by the formulation routine module, cleaning routine module, user routine module, manual adjustment module, or other module.

As shown in FIG. 5, formulation cartridge 402 has one or more formulation packets 418 disposed therein, each of which has an output nozzle 420 protruding through a distal (forward) end of the formulation cartridge 402 in a configuration that fluidic ally connects with a corresponding formulation inlet 422 of the formulation dispensing assembly 410 when the formulation cartridge 402 is fully inserted into the cartridge cavity 424.

A button 426 disposed on the reusable handle 406 and electrically connected to the controller 412 activates features of the formulation delivery device 400 described above. In some embodiments, depressing the button 426 activates the features of any of the modules described above in FIG. 2. For example, in some embodiments, pressing button 426 activates a sleep/awake module stored in controller 412, thereby awakening formulation delivery device 400 from a sleep state to an awake state. In some embodiments, pressing button 426 while a formulation cartridge is inserted into the reusable handle 406 activates a formulation routine module stored in controller 412, thereby initiating a formulation routine.

In some embodiments, pressing button 426 while a cleaning cartridge is inserted into the reusable handle 406 activates a cleaning routine module stored in the controller 412, thereby initiating a cleaning routine. Visual indicators 428 (e.g., LEDs) disposed along the reusable handle 406 indicate one or more of a remaining formulation quantity or a remaining battery life, e.g., based upon a dispensed time determined by the formulation routine module of the controller. Some embodiments include additional buttons and/or a different number of visual indicators 428 with different functionalities, and the illustrated embodiment is not limiting. In some embodiments, visual indicator 428 is a multi-segment LED with each segment corresponding to an equal proportion of the formulation remaining in the formulation cartridge.

Controller 412 comprises logic (stored in a data store thereof), which when executed by a processor of the controller 412, causes a cartridge authentication interface 430 disposed in the reusable handle 406 (e.g., an RFID reader) to read an encryption chip 432 on the formulation cartridge 402 in order to authenticate the formulation cartridge 402. The encryption chip 432 stores at least one of the formulation cartridge 402, a formulation identification, a beginning formulation quantity, a formulation expiration date, or a formulation production date.

Controller 412 also comprises logic, which when executed, causes the formulation delivery device to execute, based upon authenticating the formulation cartridge 402, a formulation routine that dispenses a mixed formulation (of the first formulation and the second formulation) from the formulation cartridge 402 through the formulation dispensing assembly. For example, the formulation delivery device authenticates the first and second formulations after (or upon) insertion of a formulation cartridge into the reusable handle, and then, in response to pressing a button on the reusable handle, executes a formulation routine which causes formulation dispensing assembly 410 to continuously or continually mix the first and second formulations, and to dispense the same from the reciprocating nozzle assembly at one or more of the following predetermined device operating parameters for as long as the button is depressed: a formulation flow rate, a reciprocating frequency, or a reciprocating amplitude.

In some embodiments, controller 412 also comprises logic, which when executed, causes the formulation delivery device to execute, based upon authenticating a cleaning cartridge inserted into the reusable handles, a cleaning routine that dispenses a cleaning liquid through the formulation dispensing assembly. For example, the formulation delivery device authenticates a cleaning cartridge inserted into the reusable handle, and then, in response to pressing a button on the reusable handle, executes a cleaning routine which causes formulation dispensing assembly 410 to continuously or continually dispense a cleaning liquid (e.g., water) from the reciprocating nozzle assembly at one or more of the following predetermined device operating parameters for as long as the button is depressed: a cleaning liquid flow rate, a reciprocating frequency, or a reciprocating amplitude. In some embodiments, the cleaning liquid flow rate is higher than any formulation flow rate of one or more of the formulation routines stored in the controller 412, for the advantage of effectively flushing residual formulation from the formulation dispensing assembly.

Pull through adaptor 404 attaches to the reusable handle 406 over the reciprocating nozzle assembly 414. In some embodiments, pull through adaptor 404 provides an audible feedback signal upon correct engagement with the reusable handle 406.

Figure 6:
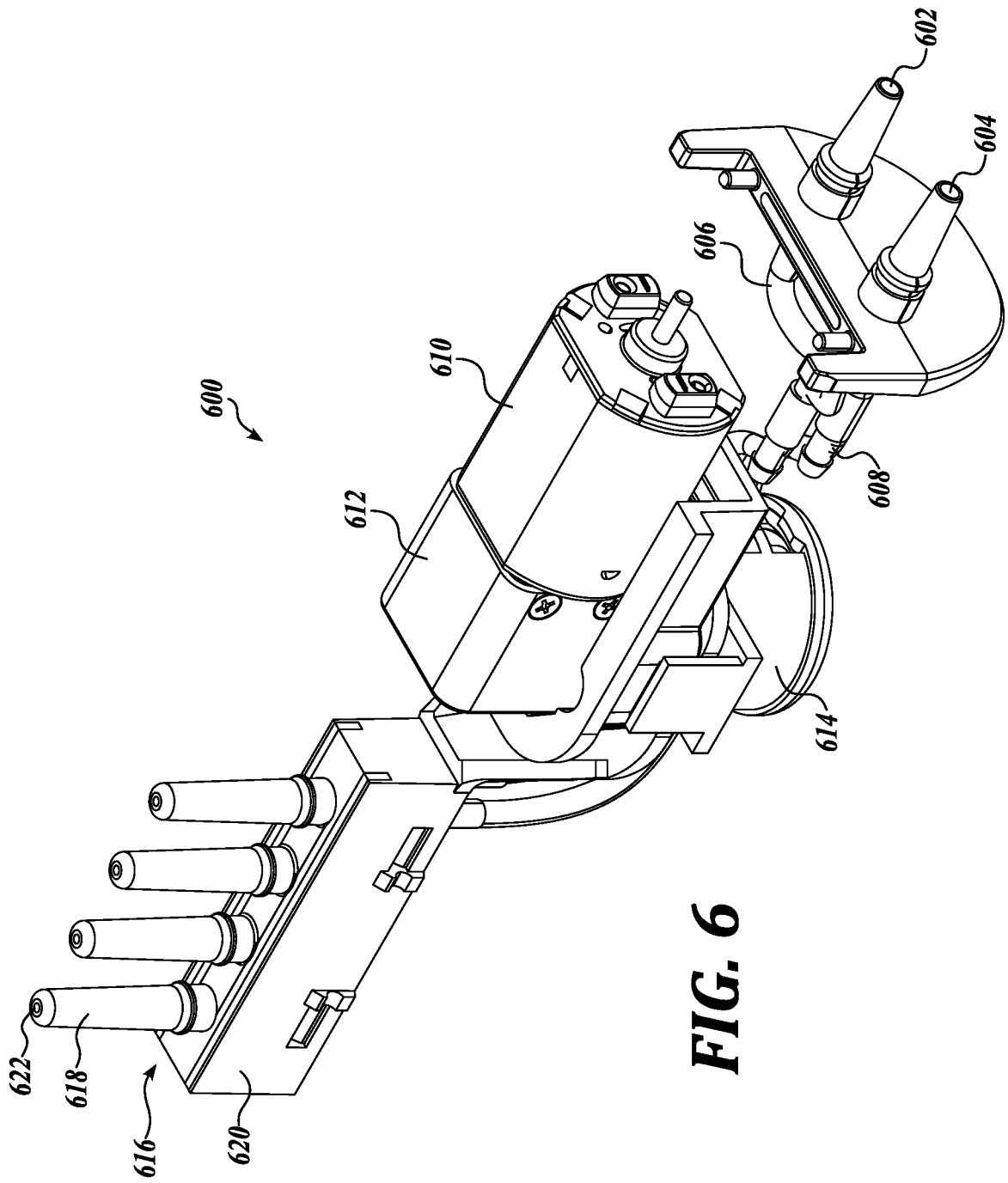
FIG. 6 shows a perspective view of a formulation dispensing assembly, in accordance with a representative embodiment of the present disclosure.
Figure 7:
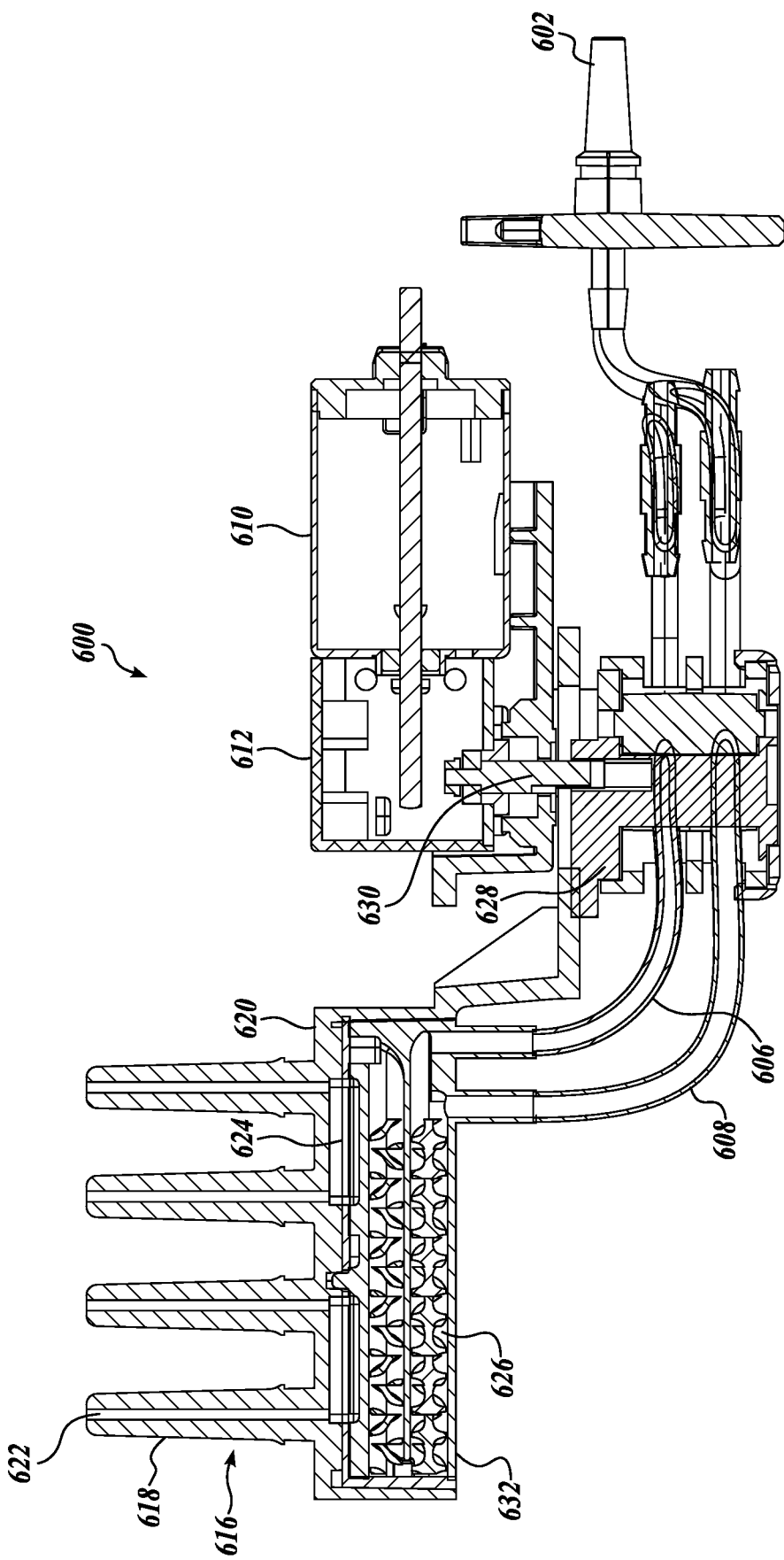
FIG. 7 shows a side section view of the formulation dispensing assembly of FIG. 6.

FIG. 6-FIG. 7 show a representative formulation dispensing assembly 600, which is compatible with any of the formulation delivery devices, formulation cartridges, and cleaning cartridges described herein. The primary function of the formulation dispensing assembly 600 is to dispense a mixed formulation of two different formulations from a formulation cartridge onto a user's skin or hair. In some embodiments, the formulation dispensing assembly 600 dispenses the mixed formulation at a flow rate of 20-40 mL/min or 120 mL per four minutes, e.g., 20-35 mL/min, 20-30 mL/min, 20-25 mL/min, 25-35 mL/min, 25-30 mL/min, or 35-40 mL/min.

Formulation dispensing assembly 600 includes a first formulation inlet 602 and a second formulation inlet 604, a first fluid conduit 606 and a second fluid conduit 608 fluidically connected to the first formulation inlet 602 and second formulation inlet 604, respectively. In some embodiments, each of the first formulation inlet 602 and second formulation inlet 604 are formed as protrusions extending rearwardly (i.e., toward the cartridge cavity when disposed in the reusable handle) from the first fluid conduit and the second fluid conduit, respectively, toward a rear end of the reusable handle, the protrusions being configured to project into the formulation cartridge.

The formulation dispensing assembly 600 also includes a motor 610, a gearbox 612 operatively connected to the motor 610, and a pump 614 driven by the motor 610 via the gearbox 612. In some embodiments, pump 614 is a peristaltic pump, which has been discovered to improve formulation dispensing when utilized in combination with the mixing chambers and tapered formulation channels described herein.

A reciprocating nozzle assembly 616 includes a plurality of annular nozzles 618 disposed on a comb 620, that, in use, cycles back-and-forth along a track of the reusable handle 406 while dispensing formulation onto a user's skin or hair, in order to achieve more uniform formulation coverage. Each of the nozzles 618 includes a formulation channel 622 therethrough, each of which is fluidically connected to the first fluid conduit 606 and second fluid conduit 608 via manifold 624. In some embodiments, each formulation channel 622 is tapered, for the advantage of increasing the formulation dispensing velocity and/or for further mixing the two formulations. The tapered formulation channel has proven advantageous when utilized in combination with other features described herein, e.g., wherein the pump 614 is a peristaltic pump and/or wherein the turbulent mixing chamber includes one or more helical mixers 626.

The motor 610 and gearbox 612 drive the reciprocating nozzle assembly 616 in linear reciprocating motion. In an embodiment, the linear reciprocating motion is motivated by an eccentric roller 628 coupled to an output shaft 630 of the gearbox 612, which eccentric roller 628 rotates inside an annular bracket of the comb 620. Driving the pump 614 and reciprocating nozzle assembly 616 with a common motor 610 improves power efficiency, reduces weight and size, thereby improving the form factor of the formulation delivery device. Nevertheless, some embodiments use more than one motor to drive the pump 614 and reciprocating nozzle assembly 616.

Nozzles 618 are fluidically connected to the first fluid conduit 606 and second fluid conduit 608 via a turbulent mixing chamber 632, which mixes a first formulation drawn from the formulation cartridge via the first fluid conduit 606 with a second formulation drawing from the formulation cartridge via the second fluid conduit 608 to create mixed formulation. In particular, the turbulent mixing chamber 632 mixes the two formulations by combining the same in a common chamber under pressure, and flowing the two formulations past one or more mixing elements, which create turbulent flow of the mixed formulation (as distinguished from laminar flow). The proportions of the first formulation to the second formulation vary in different embodiments. For example, is some embodiments, the mixed formulation is a mixture of a first formulation and a second formulation at a ratio of about 0.8:1.0-1.2:1.0, e.g., 0.85, 0.90, 0.95, 1.00, 1.05, 1.10, or 1.15.

In some embodiments, turbulent mixing chamber 632 is disposed between the pump 614 and the reciprocating nozzle assembly 616. In this configuration, the two formulations are mixed just before dispensing, which creates a more uniform formulation consistency and results in better formulation dispensation from the nozzles 618, as compared to mixing the formulations upstream of the pump 614.

In some embodiments, turbulent mixing chamber 632 includes a helical mixer 626 disposed therein. Some embodiments include a plurality of helical mixers 626 fluidically connected in series along a fluidic pathway within the turbulent mixing chamber 632, for improved mixing. In some embodiments, each helical mixer has an outside diameter between 2.00 mm and 5.00 mm, e.g., between 3.0 mm and 4.00 m, e.g., 3.18 mm. In some embodiments, each helical mixer has a total length of between and 40.0 mm, e.g., between 25.0 mm and 35.0 mm, e.g., 33.0 mm. In some embodiments, each helical mixer has a length-to-diameter pitch (defined as total length/[outside diameter*#mixing elements]) between 0.75 and 1.25, e.g., between 0.80 and e.g., 0.865. The combination of the foregoing specifications has been discovered to produce the best consistency of mixed formulation, particularly when the two formulations are not mixed until downstream of the pump 614, just upstream of the reciprocating nozzle assembly 616, and also when the pump 614 is a peristaltic pump.

In use, the pump 614 draws formulation from the connected formulation cartridge, through the first fluid conduit 606 and second fluid conduit 608, through the turbulent mixing chamber 632, through manifold 624, and through the nozzles 618. In the illustrated embodiment, the first fluid conduit 606 and second fluid conduit 608 are kept fluidically separate until downstream of pump 614, to prevent mixing of the two formulations until the turbulent mixing chamber 632. As stated previously, mixing the two formulations just before dispensation (i.e., between the pump 614 and manifold 624), improves the consistency of the mixed formulation.

FIG. 8A-FIG. 10 show a representative formulation cartridge 800 of a formulation cartridge type which is compatible with any of the formulation delivery systems, formulation delivery devices, and formulation product lines described herein. However, the formulation delivery systems, formulation delivery devices, and formulation product lines described herein are not required to use the sustainable formulation cartridge 800 shown in FIG. 8A-FIG. 10.

Formulation cartridge 800 is a sustainable embodiment specifically designed to reduce waste and environmental impact, while delivering a user-friendly experience. To that end, formulation cartridge 800 includes two main components: a handle portion 802 and a disposable refill packet 804 configured to reversibly slide into the handle portion 802. Historically, known cartridges were designed to be entirely disposed after depletion of the formulation stored therein, leading to significant waste and higher consumer cost.

In contrast to known cartridges, the formulation cartridge 800 is constructed such that the handle portion 802 can be reused indefinitely and, only the disposable refill packets 804 need to be discarded or recycled after depletion of the formulation stored therein. Further still, each disposable refill packet 804 is configured to be deconstructed into smaller components, some of which can be recycled, and others disposed of. Thus, the formulation cartridge 800 utilizes an innovative structure to reduce waste and improve the user experience.

Handle portion 802 is sized, dimensioned, and constructed to be repeatedly inserted into the cartridge cavity of the formulation delivery device. Accordingly, handle portion 802 is formed of ABS plastic or similar rigid polymer or other material and includes a hollow handle portion 802 configured to receive the disposable refill packet 804 therein, and a tray portion 806 that extends away from handle portion 802. Handle portion 802 is a two-piece assembly in the representative embodiment shown (although it may be one-piece in other embodiments), and is sized and dimensioned such that it forms a seamless extension of the formulation delivery device handle when fully inserted into a cartridge cavity thereof. Tray portion 806 projects away from handle portion 802 and has a U-shape configured to support the disposable refill packet 804 (e.g., the front body portion 810). To facilitate secure engagement and easy removal, handle portion 802 includes coupling means for coupling the formulation cartridge 800 to a reusable handle of a formulation delivery device. Representative coupling means include a cartridge release 812 (e.g., a latch) formed in the handle portion 802, which engages the formulation delivery device upon proper and complete insertion.

Disposable refill packet 804 stores a first formulation packet 814 and a second formulation packet 816, which respectively contain a first formulation 818 and a second formulation 820. Each of first formulation packet 814 and second formulation packet 816 has a between 40 mL and 70 mL, e.g., 50 mL-60 mL, or 55 mL. In some embodiments, first formulation packet 814 and second formulation packet 816 have different volumes.

The first formulation 818 and second formulation 820 can each be any of the formulations described herein, for example a permanent hair dye; semi-permanent hair dye; developer; conditioner; hair growth treatment, such as minoxidil; hair protein treatment; disulfide bond repairing hair treatment; fluid hair treatment; fluid scalp treatment, or the like. In some embodiments, the first formulation 818 and second formulation 820 differ. For example, in some embodiments, the first formulation 818 is a hair dye and the second formulation 820 is a developer. In other embodiments, the first formulation 818 and second formulation 820 are the same (e.g., a conditioner or scalp treatment formulation).

Figure 9:
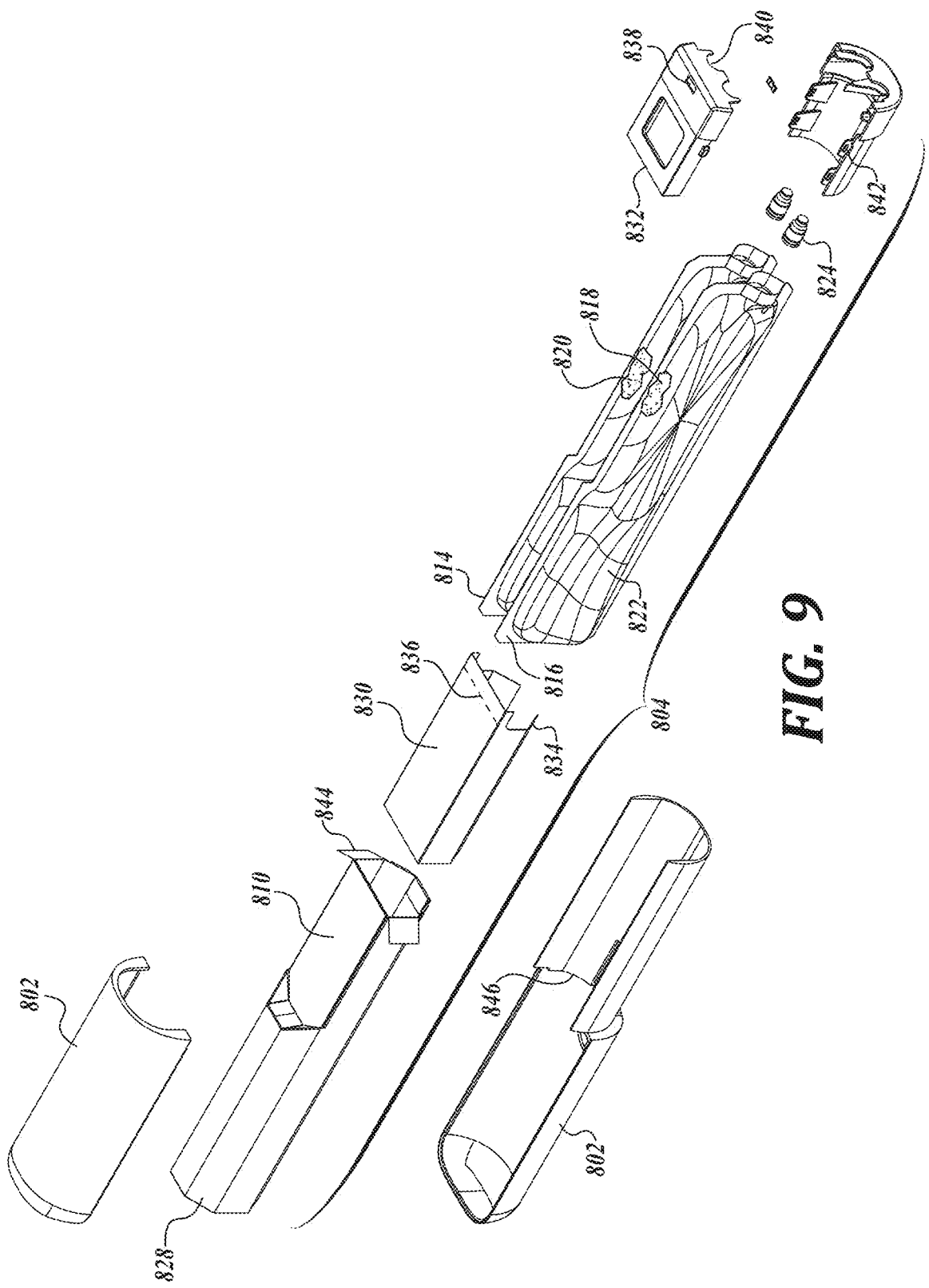
FIG. 9 shows an exploded perspective view of the formulation cartridge of FIG. 8A.
Figure 10:
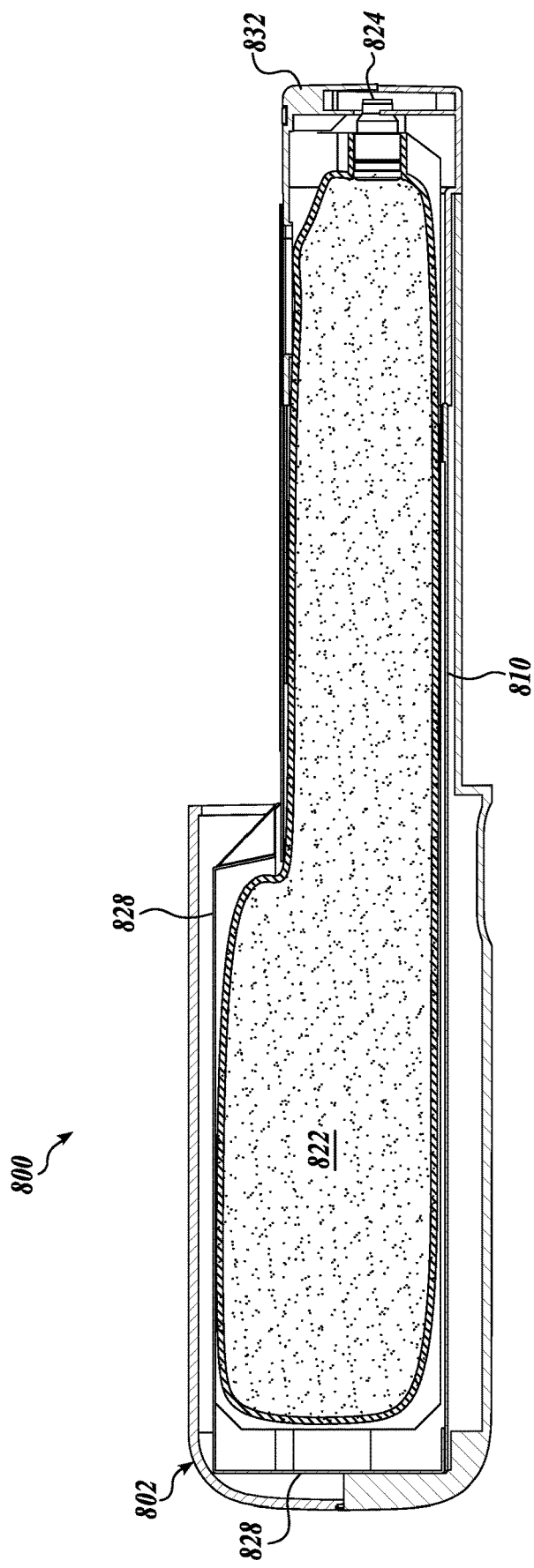
FIG. 10 shows a side section view of the formulation cartridge of FIG. 8A.

As shown in FIG. 9, each formulation packet includes a formulation-containing packet 822 and valve means for selectively-fluidic coupling the disposable refill packet to a dispensing nozzle unit of a formulation delivery device when the formulation cartridge 800 is received within the hand-held formulation dispensing device. Representative valve means include a valve 824 through which the formulation exits the packet 822. Representative formulation packets are described in International Patent Application No. PCT/US2018/052345, filed Sep. 24, 2018 and assigned to L'Oreal SA, and U.S. patent application Ser. No. 17/133,110, filed Dec. 23, 2020 and assigned to L'Oreal SA, both of which are hereby incorporated by reference in their entireties for all purposes.

Disposable refill packet 804 also includes a disposable elongate body portion 826 which provides structure to the disposable refill packet 804 and contains the first formulation packet 814 and second formulation packet 816. In some embodiments, body portion 826 has a total length between 150 mm and 250 mm (e.g., 175 mm-225 mm, 185 mm-215 mm, 195 mm-205 mm, or 200 mm) and a maximum cross sectional dimension of 25 mm-50 mm (e.g., 30 mm-45 mm, 35 mm-40 mm, or 36 mm). Body portion 826 has a rear body portion 828 and a slender front body portion 810. The rear body portion 828 has a larger cross-sectional dimension than the front body portion 810 and remains inside the handle portion 802 of the handle portion 802 (e.g., by friction fit) during use. The slender front body portion 810 is supported by the tray portion 806 of the handle portion 802, and projects into the cartridge cavity of the formulation delivery device during use.

In the illustrated embodiment, body portion 826 is constructed from a recyclable material, e.g., structured paper (e.g., cardboard). In some embodiments in which the body portion 826 is formed of paper, the paper has a weight between 8-12 points (e.g., 8.5 points, 9.0 points, 9.5 points, 10.0 points, 10.5 points, 11.0 points, or 11.5 points), to impart sufficient stiffness without contributing excess disposable material. In some such embodiments, the body portion 826 is formed of a single piece of the recyclable material. As one example, in the illustrated embodiment, the body portion 826 is formed of a single piece of paper. As shown in FIG. 9, this folded construction creates an eight-sided polygonal cross section in the rear body portion 828 and a six-sided polygonal cross section in the front body portion 810. To facilitate assembly, some embodiments of the body portion 826 include one or more scores or guidelines that ensure correct folding. The polygonal cross section of the illustrated embodiment is representative, not limiting. Other embodiments have a triangular, rectangular, pentagonal, hexagonal, heptagonal, octagonal, or other polygonal cross-sectional shape. In other embodiments, body portion 826 has the shape and structure described herein, but it not constructed from a recyclable material.

Optional packet sleeve 830 provides several important advantages. First, it imparts additional structure to the disposable refill packet 804 by sliding over and reinforcing front body portion 810. Accordingly, in some embodiments, packet sleeve 830 has a greater weight or thickness as compared to the material that forms body portion 826; although this is not required. In some embodiments, packet sleeve 830 is also formed of a recyclable material, which may be the same recyclable material as the body portion 826.

Second, packet sleeve 830 couples with the valve frame 832. For example, the illustrated packet sleeve 830 includes a plurality of engagement member recesses 834 configured to reversibly couple with engagement members of the valve frame 832.

Figure 8A:
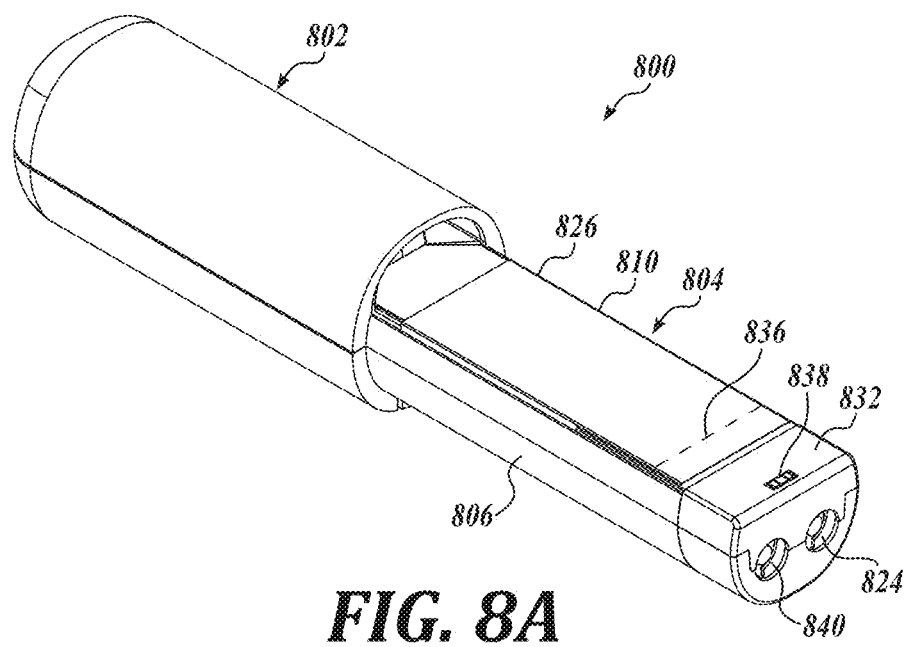
FIG. 8A shows a first perspective view of a formulation cartridge, in accordance with a representative embodiment of the present disclosure.
Figure 8B:
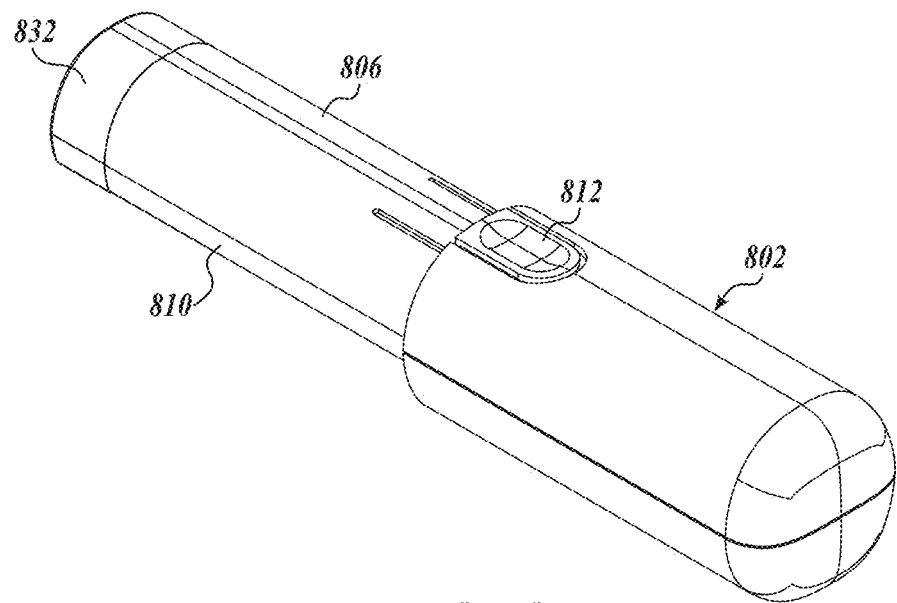
FIG. 8B shows a second perspective view of the formulation cartridge of FIG. 8A.

Third, packet sleeve 830 facilitates disassembly of the disposable refill packet 804. As shown in FIG. 8A and FIG. 9, packet sleeve 830 includes an optional integral tearaway 836 (e.g., a perforation with a pull tab). In use, after the formulation is depleted, a user pulls the pull tab of integral tearaway 836, thereby separating valve frame 832 from packet sleeve 830. Upon completion of this action, the packet sleeve 830 is recycled and the valve frame 832 is discarded. In some embodiments, the integral tearaway 836 is disposed on the body portion 826, e.g., the front body portion 810.

Although packet sleeve 830 imparts several advantages, it is optional. In some embodiments, one or more of the above features of the packet sleeve 830 are integrally formed in the body portion 826.

Valve frame 832 provides a rigid structure which supports the formulation packet valves 824 and an encryption chip 838 for accurate and solid coupling with the formulation delivery device (and in particular, with the formulation dispensing assembly thereof), and for accurate positioning of the encryption chip 838 adjacent to the cartridge authentication interface of the formulation delivery device. Accordingly, valve frame 832 is formed from ABS plastic, HDPE, or other rigid polymer or other material. A plurality of valve engagement units 840 extend through a front end of the valve frame 832. Each valve engagement unit 840 receives and secures one of the formulation packet valves 824. In some embodiments, the valve engagement unit 840 is a valve aperture disposed through a face of the valve frame 832, the valve aperture being sized to receive a valve of a formulation packet. To enable coupling with the packet sleeve 830 (or body portion 826 in some embodiments), valve frame 832 includes engagement members 842 (e.g., tabs) extending therefrom.

Encryption chip 838 is disposed on the disposable refill packet 804, e.g., on the body portion 826 or on the valve frame 832 (as in the illustrated embodiment). The encryption chip 838 is positioned on the disposable refill packet 804 such that when the formulation cartridge 800 is inserted into the formulation delivery device, it is positioned to be read by the cartridge authentication interface thereof. Accordingly, the encryption chip 838 stores information about the formulation cartridge 800 and its contents, for example at least one of a formulation identification, a beginning formulation quantity, a formulation expiration date, or a formulation production date.

Thus, the body portion 826, packet sleeve 830, formulation packets, and valve frame 832 form the disposable refill packet 804. In use, disposable refill packet 804 is reversibly couplable with handle portion 802, e.g., by securing means such as friction fit between the disposable refill packet 804 and the handle portion 802 and coupling tabs 844 on the body portion 826 or packet sleeve 830. The coupling tabs 844 engage the handle portion 802 upon insertion of the disposable refill packet 804 therein and retains the same therein until forcefully pulled out of the handle portion 802. To further aid retention of the disposable refill packet 804 within handle portion 802, the illustrated handle portion 802 includes one or more optional retention elements 846 (in this embodiment, a deflectable tab that engages the disposable refill packet 804).

Figure 11:
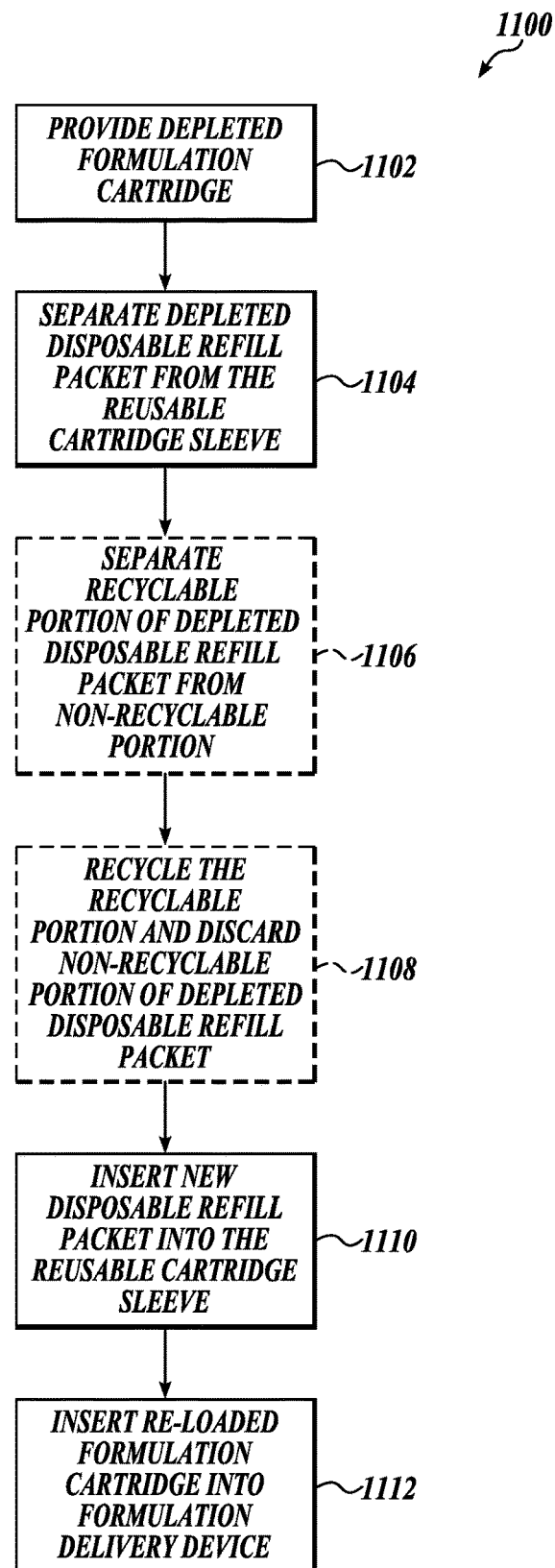
FIG. 11 shows a method of reloading a formulation cartridge, in accordance with a representative embodiment of the present disclosure.

FIG. 11 shows representative methods 1100 of the present disclosure shown in FIG. 11, which may be used with any of the formulation cartridges of the present disclosure, for example the formulation cartridge 800 of FIG. 8A-FIG. 10.

At block 1102, a depleted formulation cartridge is provided, i.e., a formulation cartridge in which a formulation packet therein is depleted of formulation. In some embodiments, the formulation cartridge is removed from a formulation delivery device, e.g., by depressing a cartridge release and pulling the formulation cartridge out of the formulation delivery device.

At block 1104, the disposable refill packet is separated from the reusable cartridge body, e.g., by pulling the disposable refill packet away from the reusable cartridge body with enough force to overcome retention forces imparted by the coupling tabs and retention elements.

In optional block 1106, a recyclable portion of the disposable refill packet is separated from a non-recyclable portion of the disposable refill packet. For example, the valve frame and formulation packets are separated from the body portion and/or the optional packet sleeve (both of which are recyclable in some embodiments), e.g., by tearing an integral tearaway on the packet sleeve or body portion and pulling the valve frame (along with the depleted formulation packets secured thereto) away from the packet sleeve and body portion.

In optional block 1108, the recyclable portion(s) of the disposable refill packet is recycled (i.e., the body portion and/or the packet sleeve), and the non-recyclable portion(s) is discarded (i.e., the depleted formulation packets and valve frame).

In block 1110, a new disposable refill packet is inserted into the reusable cartridge body.

In block 1112, the reloaded formulation cartridge is inserted again into the formulation delivery device after inserting the new disposable refill packet into the reusable cartridge body.

Thus, the present disclosure provides not only sustainable formulation cartridges, but also methods of using the same to further reduce waste and environmental impact.

Figure 12:
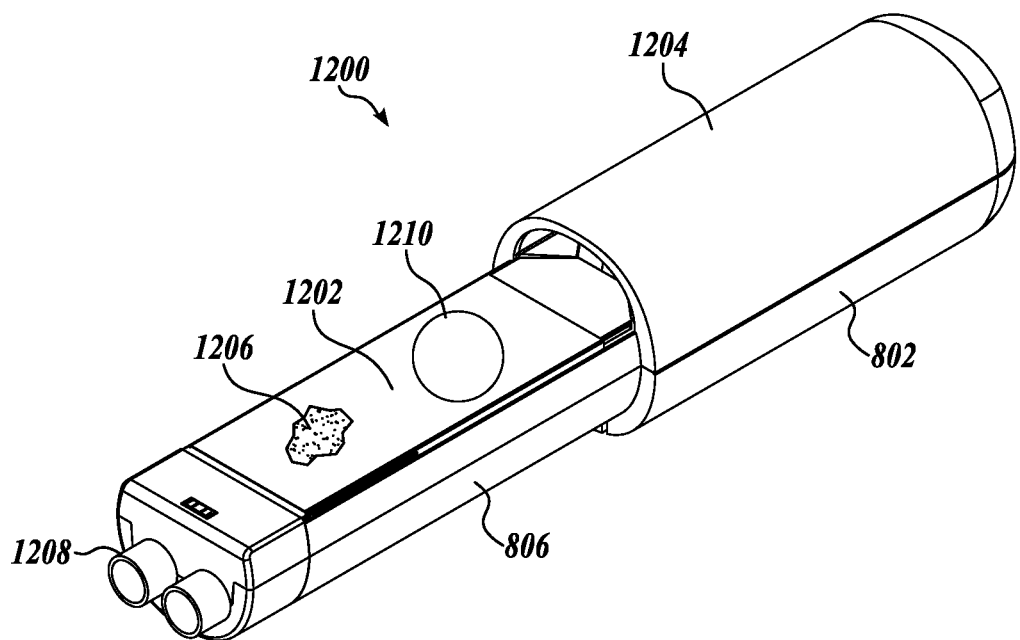
FIG. 12 shows a perspective view of a cleaning cartridge, in accordance with a representative embodiment of the present disclosure.

FIG. 12 shows a representative cleaning cartridge 1200, which has the same features as cleaning cartridges described previously, and which is compatible with any formulation delivery system, formulation delivery device, and product line of the present disclosure. Accordingly, cleaning cartridge 1200 is of a same cartridge type (e.g., is configured to securely fit inside the reusable handle of the formulation delivery device, has the same shape and dimensions and a plurality of output nozzles) as formulation cartridges described herein.

The primary function of cleaning cartridge 1200 is to fluidically connect with a formulation delivery device, and to provide a cleaning liquid 1202 (e.g., water) that is flushed through a formulation dispensing assembly as part of a cleaning routine. Accordingly, cleaning cartridge 1200 is a reusable assembly with a body portion 1204 formed of an ABS plastic or other suitably rigid polymer. Body portion 1204 supports a cleaning liquid reservoir 1206, i.e., a tank, which stores the cleaning liquid 1202 therein, e.g., 50-200 mL thereof. The cleaning liquid reservoir 1206 has a plurality of output nozzles 1208 which are sized and positioned to fluidically couple with fluid conduits of the formulation delivery device. A refill cap 1210 facilitates refilling the cleaning liquid reservoir 1206.

The present application may also reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one computing device to control (electrical, electromechanical, software-implemented, firmware-implemented, or other control, or combinations thereof) one or more aspects of the embodiment.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A formulation delivery system, comprising:
   a reusable handle having a cartridge cavity with an opening at one end of the reusable handle, the cartridge cavity is configured to reversibly receive a formulation cartridge configured to store a formulation therein and a cleaning cartridge configured to store a cleaning liquid therein, wherein the formulation cartridge includes a handle portion on one end and a tray portion extends from the handle portion, a disposable refill packet with an exterior comprised of a hollow polygon extends within the handle portion and the tray portion of the formulation cartridge, wherein a rear body portion of the disposable refill packet has a greater number of polygon sides than a more slender front body portion of the disposable refill packet, and the tray portion fits within the cartridge cavity and the handle portion abuts against the opening providing for an extended handle including the reusable handle and the handle portion of the formulation cartridge;
   a formulation dispensing assembly including a reciprocating nozzle assembly and a pump, the reciprocating nozzle assembly fluidically-coupleable, via one or more fluid conduits, to the formulation cartridge, or the cleaning cartridge, received within the reusable handle; and
   a controller including computational circuitry and logic configured to toggle between at least a cleaning routine and formulation routine responsive to one or more inputs indicative of the cleaning cartridge or the formulation cartridge inserted into the reusable handle.

2. The formulation delivery system of claim 1, wherein the controller comprises logic, which when executed, causes the formulation delivery system to:
   authenticate the formulation cartridge after insertion into the reusable handle; and
   execute, based upon authenticating the formulation cartridge, the formulation routine by dispensing the formulation from the formulation cartridge through the formulation dispensing assembly.

3. The formulation delivery system of claim 2, wherein the controller comprises logic, which when executed, causes the formulation delivery system to:
   awaken from a sleep state to an awake state upon at least one of: pressing a button on the reusable handle, insertion of the formulation cartridge into the reusable handle, or insertion of the cleaning cartridge into the reusable handle; and
   return to the sleep state after a predetermined inactivity period.

4. The formulation delivery system of claim 1, wherein the controller comprises logic, which when executed, causes the formulation delivery system to:

authenticate the cleaning cartridge after insertion into the reusable handle; and execute, based upon authenticating the cleaning cartridge, the cleaning routine by dispensing the cleaning liquid from the cleaning cartridge through the formulation dispensing assembly.

5. The formulation delivery system of claim 1, further comprising an application configured for operation on a non-transitory machine-readable storage medium of a mobile device and comprising logic, which when executed, causes the mobile device to:

accept and store at least one user profile input;

create, based upon the at least one user profile input, a user-specific routine providing instructions for using the formulation delivery device; and display the user-specific routine on the mobile device.

6. The formulation delivery system of claim 5, wherein the application comprises logic, which when executed by the mobile device, causes the mobile device to execute a calibration routine comprising:

instructing a user to position the reusable handle at a plurality of calibration locations of a body portion of the user;

recording the calibration locations; and adjusting the user-specific routine based upon the calibration locations.

7. The formulation delivery system of claim 5, further comprising a position sensor that transmits a position signal of the reusable handle to the controller;

wherein the controller comprises logic, which when executed, causes the controller to transmit a second position signal to the mobile device based upon the position signal;

wherein the application comprises logic, which when executed by the mobile device, causes the mobile device to display a correct application indication based upon the second position signal.

8. The formulation delivery system of claim 5, further comprising a position sensor that sends a position signal to the controller;

wherein the controller comprises logic, which when executed, causes the controller to transmit a second position signal based upon the position signal to the mobile device;

wherein the application comprises logic, which when executed by the mobile device, causes the mobile device to:

transmit a third position signal based upon the second position signal to an analytic platform;

retrieve a user suggestion from the analytic platform based upon the third position signal; and display the user suggestion.

9. A formulation delivery system, comprising:

a reusable handle having a cartridge cavity with an opening at one end of the reusable handle, the cartridge cavity is configured to receive a cartridge, the cartridge forming part of a formulation product line including a plurality of different cartridge types, each cartridge type selected from a cleaning cartridge type or a formulation cartridge type, wherein the formulation cartridge includes a handle portion on one end and a tray portion extends from the handle portion, a disposable refill packet with an exterior comprised of a hollow polygon extends within the handle portion and the tray portion of the formulation cartridge, wherein a rear body portion of the disposable refill packet has a greater number of polygon sides than a more slender front body portion of the disposable refill packet, and the tray portion fits within the cartridge cavity and the handle portion abuts against the opening providing for an extended handle including the reusable handle and the handle portion of the formulation cartridge;

a formulation dispensing assembly including a reciprocating nozzle assembly fluidically couple-able to the cartridge received within the reusable handle; and a controller including computational circuitry and logic configured to:

authenticate the cartridge after insertion into the reusable handle; and execute, based upon authenticating the cartridge:

a cleaning routine that dispenses a cleaning liquid from the cartridge through the formulation dispensing assembly, or a haircare formulation routine that dispenses a haircare formulation from the cartridge through the formulation dispensing assembly.

10. The formulation delivery system of claim 9, further comprising an application configured for operation on a non-transitory machine-readable storage medium of a mobile device and comprising logic, which when executed, causes the mobile device to:

accept and store at least one user profile input;

create, based upon the at least one user profile input, a user-specific routine providing instructions for using the formulation delivery system; and display the user-specific routine on the mobile device.

11. The formulation delivery system of claim 10, wherein the application comprises logic, which when executed by the mobile device, causes the mobile device to select at least one formulation of a plurality of different formulations from the formulation product line based upon at least one of the user profile inputs or user-specific routine inputs.

12. The formulation delivery system of claim 11, wherein the application comprises logic, which when executed by the mobile device, causes the mobile device to display a purchase interface for the selected formulation.

13. A formulation delivery device, comprising:

a reusable handle and a formulation cartridge therein, wherein, the reusable handle includes a cartridge cavity with an opening at one end of the reusable handle, and the formulation cartridge includes a handle portion on one end and a tray portion extends from the handle portion, a disposable refill packet with an exterior comprised of a hollow polygon extends within the handle portion and the tray portion of the formulation cartridge, wherein a rear body portion of the disposable refill packet has a greater number of polygon sides than a more slender front body portion of the disposable refill packet, and the tray portion fits within the cartridge cavity and the handle portion abuts against the opening providing for an extended handle including the reusable handle and the handle portion of the formulation cartridge; and a formulation dispensing assembly disposed in the reusable handle, the formulation dispensing assembly having:

at least a first fluid conduit and a second fluid conduit that are respectively configured to fluidically connect with a first formulation packet and a second formulation packet of the formulation cartridge;

a pump fluidically connected to the first fluid conduit and second fluid conduit;

a reciprocating nozzle assembly fluidically connected to the first fluid conduit, the second fluid conduit, and the pump; and a controller disposed in the reusable handle, wherein the controller comprises logic, which when executed, causes the formulation delivery device to:
   authenticate the formulation cartridge; and
   execute, based upon authenticating the formulation cartridge, a formulation routine that manages:
      a reciprocating frequency of the reciprocating nozzle assembly, and
      a dispensing rate of a formulation from the formulation cartridge through the formulation dispensing assembly.

14. The formulation delivery device of claim 13, wherein the controller comprises logic, which when executed, causes the formulation delivery device to:
   authenticate a cleaning cartridge inserted into the reusable handle; and
   execute, based upon authenticating the cleaning cartridge, a cleaning routine that dispenses a cleaning liquid from the cleaning cartridge through the formulation dispensing assembly.

15. The formulation delivery device of claim 13, wherein the formulation dispensing assembly comprises a turbulent mixing chamber in fluid connection with the first fluid conduit and the second fluid conduit, the turbulent mixing chamber comprising a helical mixer.

16. The formulation delivery device of claim 15, wherein the helical mixer has a total length between 20.0 mm and 40.0 mm.

17. The formulation delivery device of claim 16, wherein the helical mixer helical mixer has a length-to-diameter pitch between 0.75 and 1.25, wherein the length-to-diameter pitch is defined as:
   length-to-diameter pitch=total length/[outside diameter*number of mixing elements].

18. The formulation delivery device of claim 13, further comprising a pull through adaptor that attaches to the reusable handle over the reciprocating nozzle assembly.

19. The formulation delivery device of claim 13, further comprising a cartridge authentication interface disposed in the reusable handle that reads an encryption chip of the formulation cartridge after insertion of the formulation cartridge into the reusable handle.

20. The formulation delivery device of claim 19, wherein the formulation delivery device comprises logic, which when executed by the controller, causes the formulation delivery device to determine, from the encryption chip, at least one of a formulation identification, a beginning formulation quantity, a formulation expiration date, or a formulation production date.

* * * * *